July 31, 1962     LE ROY J. LANGE     3,047,223
AUTOMATIC OBSERVER

Filed Nov. 9, 1960     12 Sheets-Sheet 1

INVENTOR.
LeRoy J. Lange
BY George H. Simmons
Atty

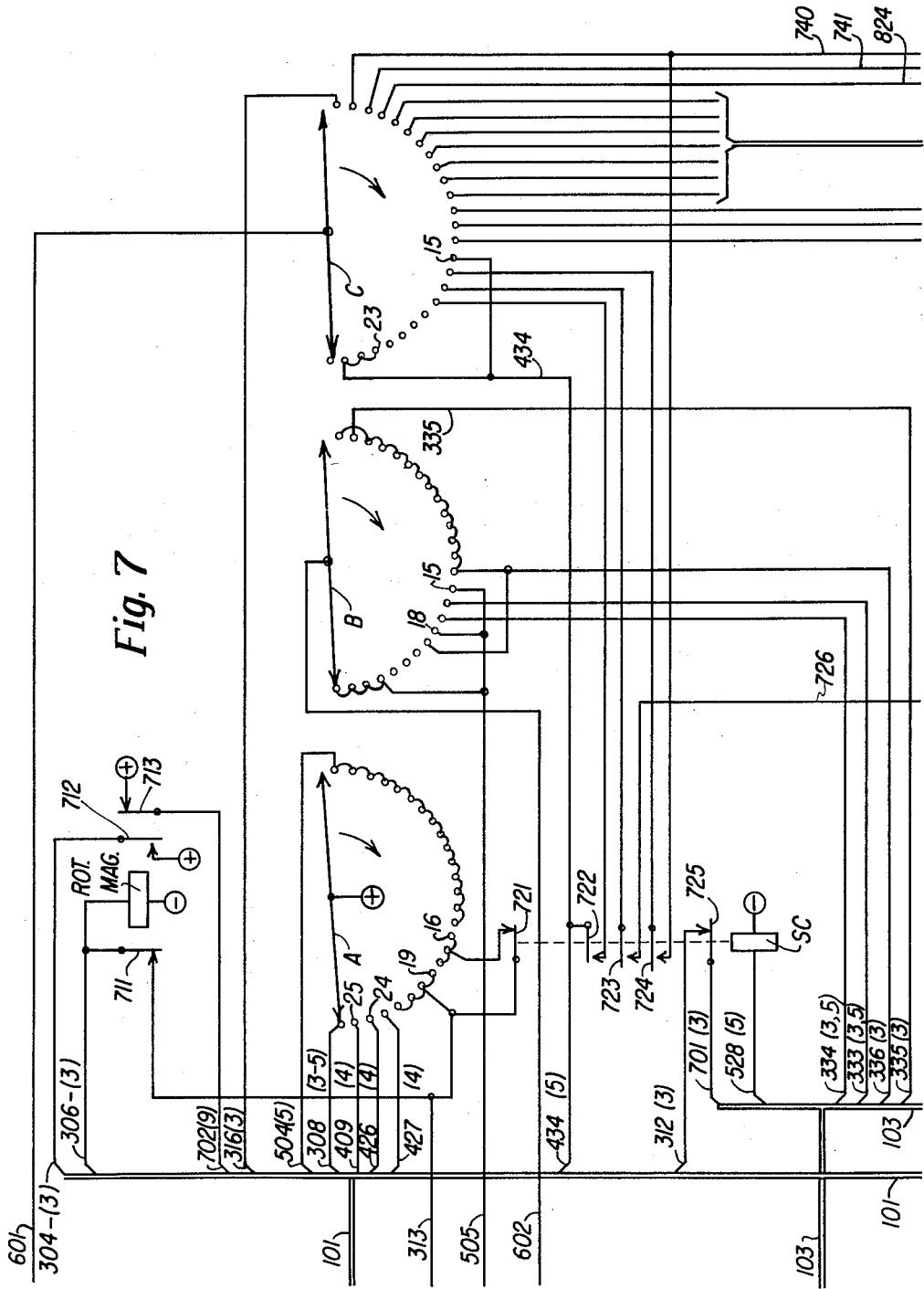

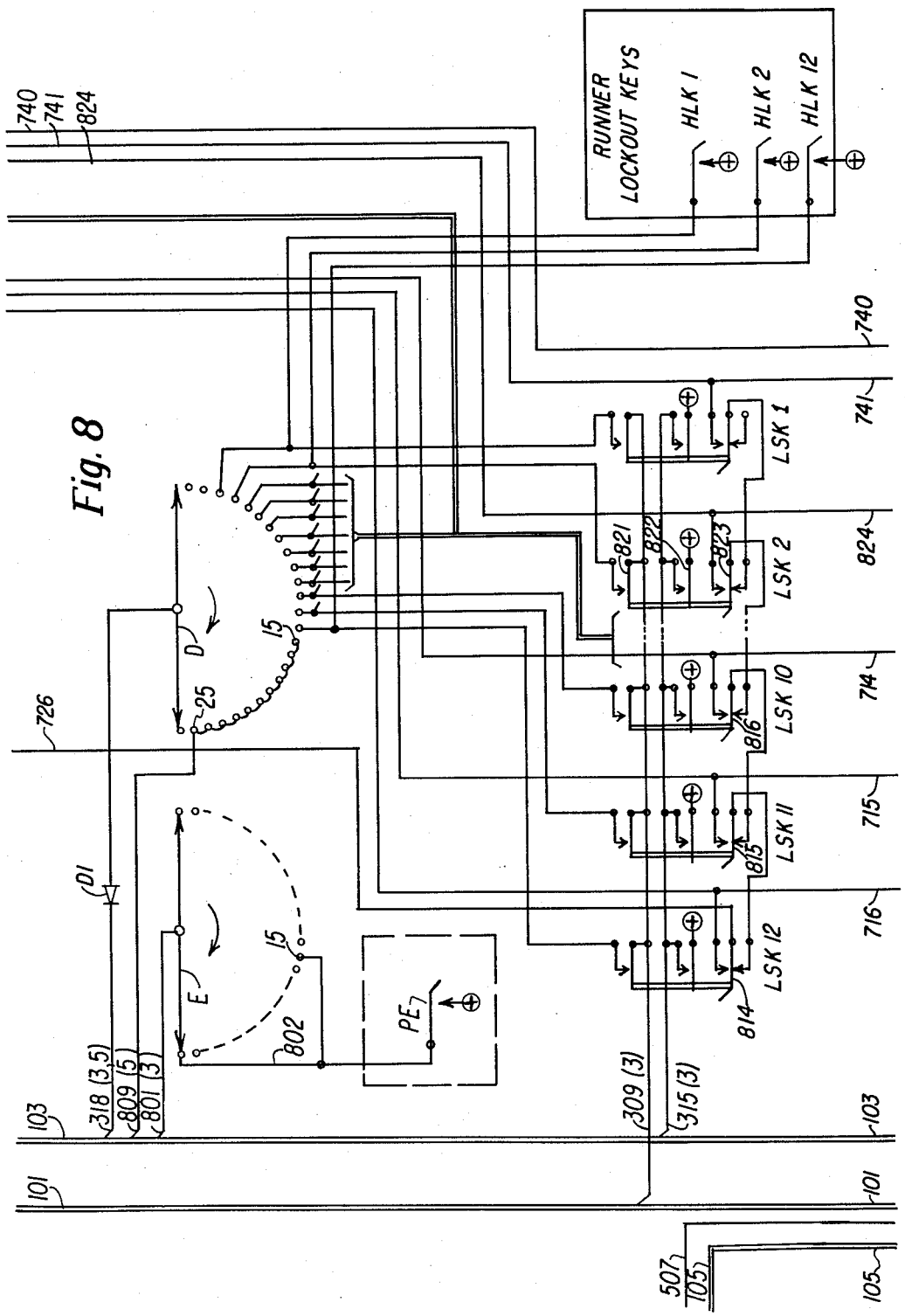

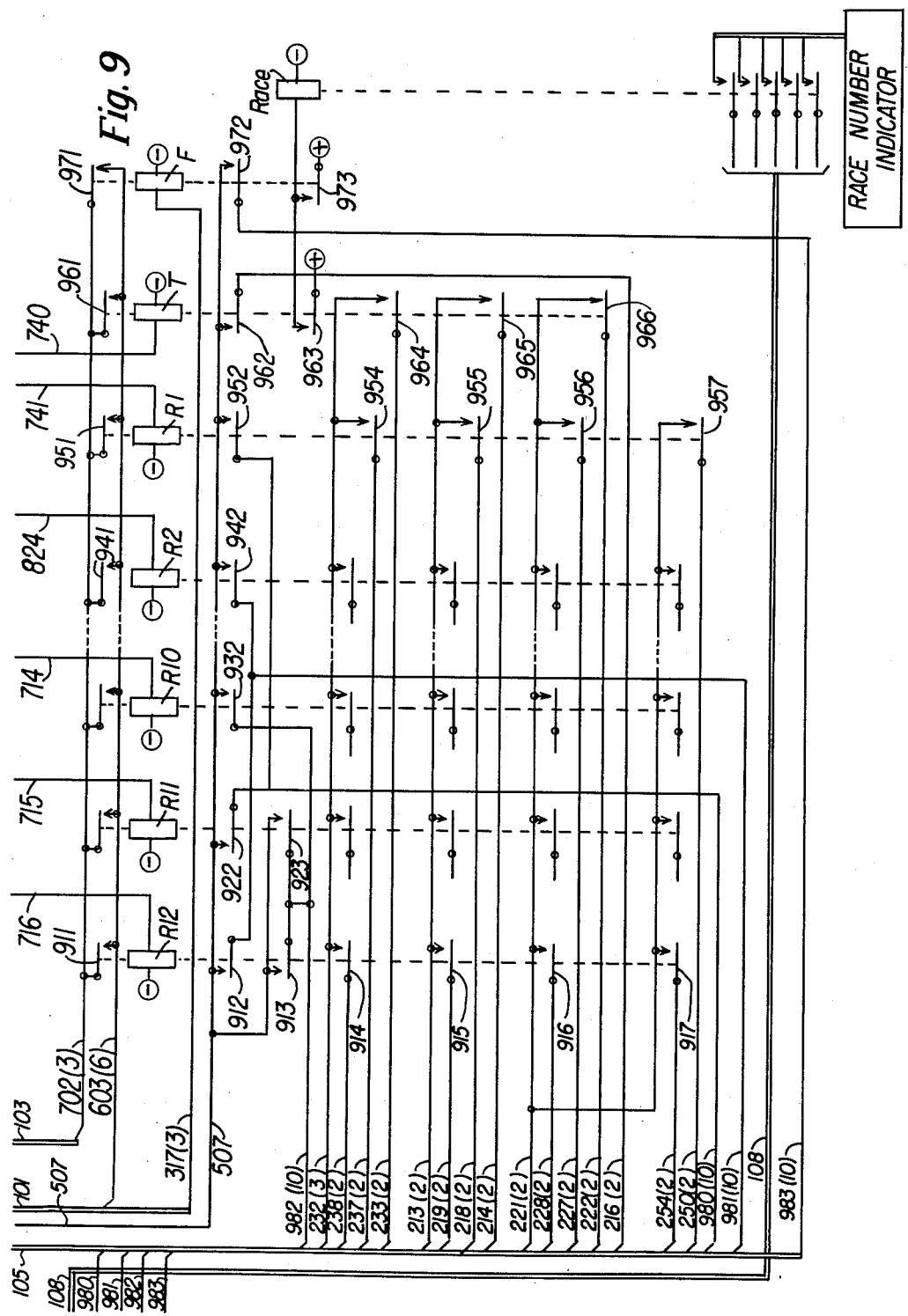

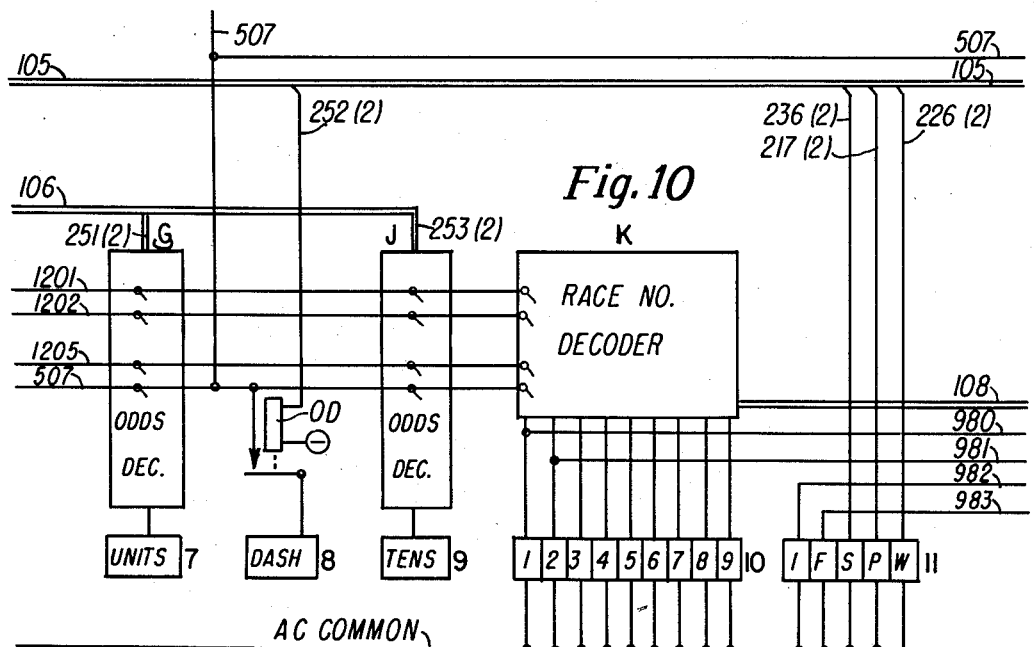
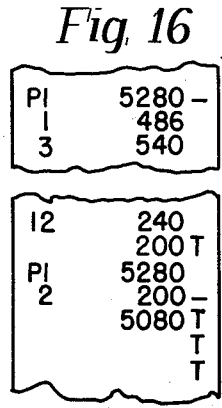
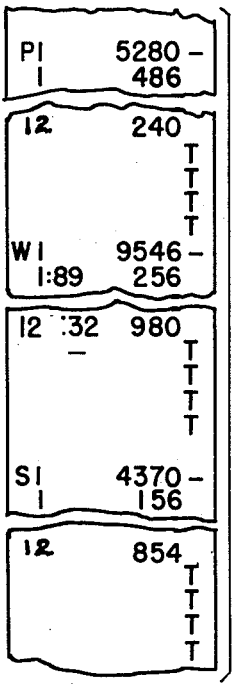
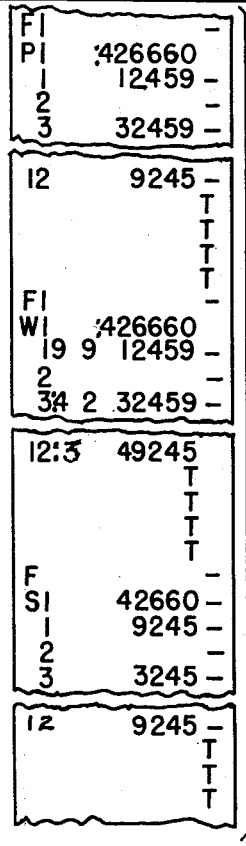

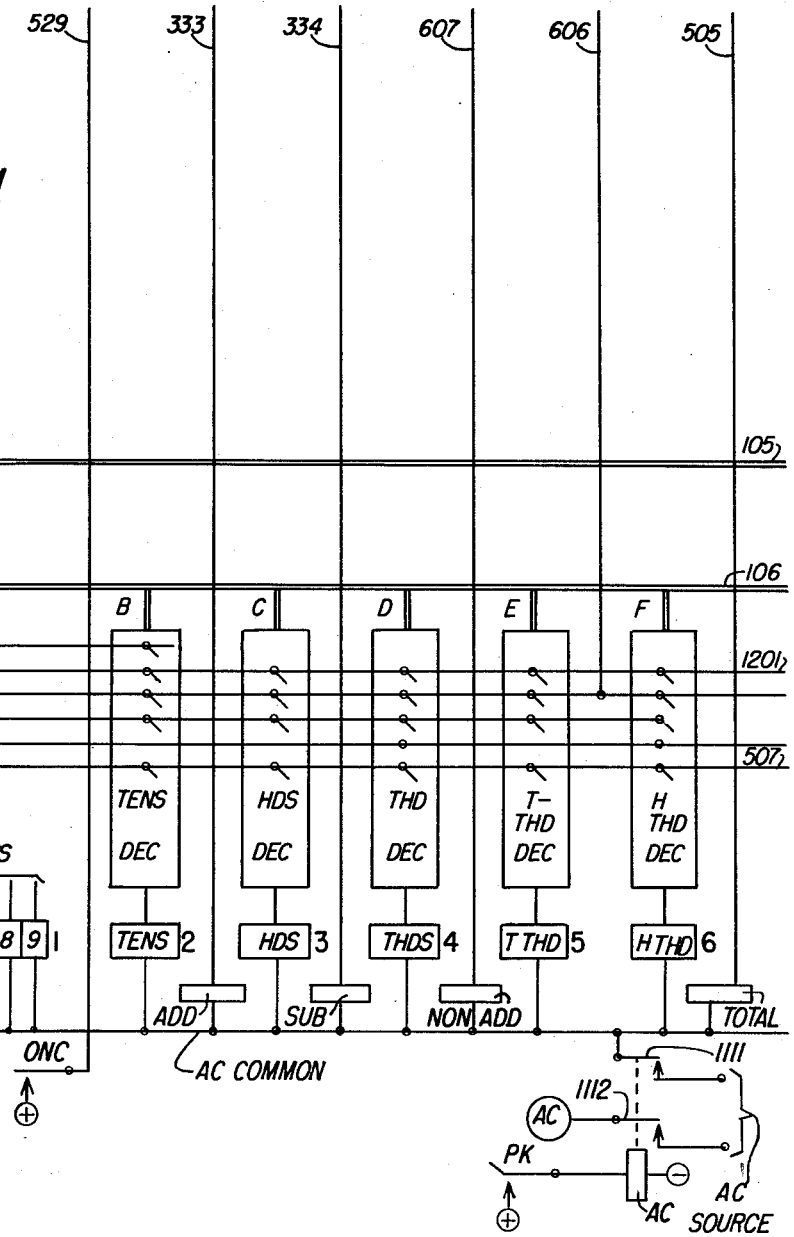

July 31, 1962  LE ROY J. LANGE  3,047,223
AUTOMATIC OBSERVER
Filed Nov. 9, 1960  12 Sheets-Sheet 12

| RELAYS | DIGIT | RELAYS | DIGIT |
|--------|-------|--------|-------|
| 1 & 5  | 1     | 1 & 4  | 6     |
| 3 & 5  | 2     | 1 & 3  | 7     |
| 2 & 3  | 3     | 4 & 5  | 8     |
| 1 & 2  | 4     | 2 & 4  | 9     |
| 2 & 5  | 5     | 3 & 4  | 0     |

United States Patent Office 3,047,223
Patented July 31, 1962

3,047,223
AUTOMATIC OBSERVER
Le Roy J. Lange, Towson, Md., assignor to American Totalisator Company, Division of Universal Controls, Inc., Towson, Md., a corporation of Maryland
Filed Nov. 9, 1960, Ser. No. 68,302
16 Claims. (Cl. 235—92)

This invention relates to a device for automatically connecting numbers registered in code to decoders which operate to control a solenoid operated adding machine to record those numbers on a tape, and has for its principal object the provision of a new and improved device of this kind.

It is a main object of the invention to provide an automatically operated observer device which connects decoders to a plurality of multi-digit numbers, registered in code, one at a time in sequence, which decoders register the number in an adding machine which is then operated to print the number on a tape and then to disconnect the decoders from that number and to connect them to the next number.

Another object of the invention is to provide an automatic observer containing a control unit through the operation of which an adding machine is controlled to print on a tape an identifying number simultaneously with the printing of a decoded coded number thereon.

Another object of the invention is to provide an automatic observer for use with a plurality of multi-digit numbers registered in code, which numbers are divided into groups with one number in each group being the sum of the other numbers therein, said observer selecting said numbers one at a time in sequence, decoding the selected number and registering it in an adding machine which is then operated to print said sum as a number of one sign and then operated to print the other numbers of the group as numbers of the opposite sign and to strike a total when the last number in the group has been printed, which total will be zero when the numbers have been registered, decoded and printed correctly.

Another object of the invention is to provide an automatic observer for use in connection with an indication totalisator system to check the accuracy of the registrations in the total and individual runner adding machines in each pool and to record the amounts so registered each time a new set of registrations are displayed.

Another object of the invention is to provide an automatic observer for use in connection with a totalisator system in which amounts registered in total and individual runner adding machines in each of three pools are transferred to display indicators in code at frequent intervals, which observer connects such coded indications to decoders which translate the codes to corresponding numbers which are registered in a solenoid operated adding machine which prints the numbers on a tape thereby to record the information displayed from time to time on the display indicators.

Another object of the invention is to provide an automatic observer that records values in each pool in one form during the registration of bets in a totalisator system and records those values in a distinctively different form during a final cycle so that the two records may be readily distinguished.

Another object of the invention is to provide an automatic observer for use with a totalisator system, which observer automatically computes and records the net value registered in a pool under late scratch conditions.

Further objects of the invention not specifically mentioned here will be apparent from the detailed description and claims which follow, reference being had to the accompanying drawings in which a preferred embodiment of the invention is shown by way of example and in which FIG. 1 is a block diagram illustrating the invention;

FIG. 7 is a schematic diagram of the motor magnet and part of the wipers and banks of the stepping switch;

FIG. 8 is a schematic diagram of the remaining wipers and banks of the stepping switch and the late scratch and runner lockout keys;

FIG. 9 is a schematic diagram of selecting relays that are operated one at a time in sequence by the stepping switch;

FIG. 10 is a block diagram of the seventh to the eleventh decades of the adding machine and decoders associated therewith;

FIG. 11 is a block diagram of the first six decades of the adding machine, the control solenoids thereof, and the decoders associated with the second to the sixth decades inclusive;

FIG. 14 shows a tape recorded during betting under normal conditions;

FIG. 15 shows a final cycle tape recorded under normal conditions;

FIG. 16 shows a place pool record recorded on the tape under late scratch conditions;

FIG. 17 shows a place pool final cycle record recorded under late scratch conditions; and FIG. 18 is a diagram illustrating the manner in which FIGS. 2 to 12, inclusive, are to be connected together.

Figure 1:
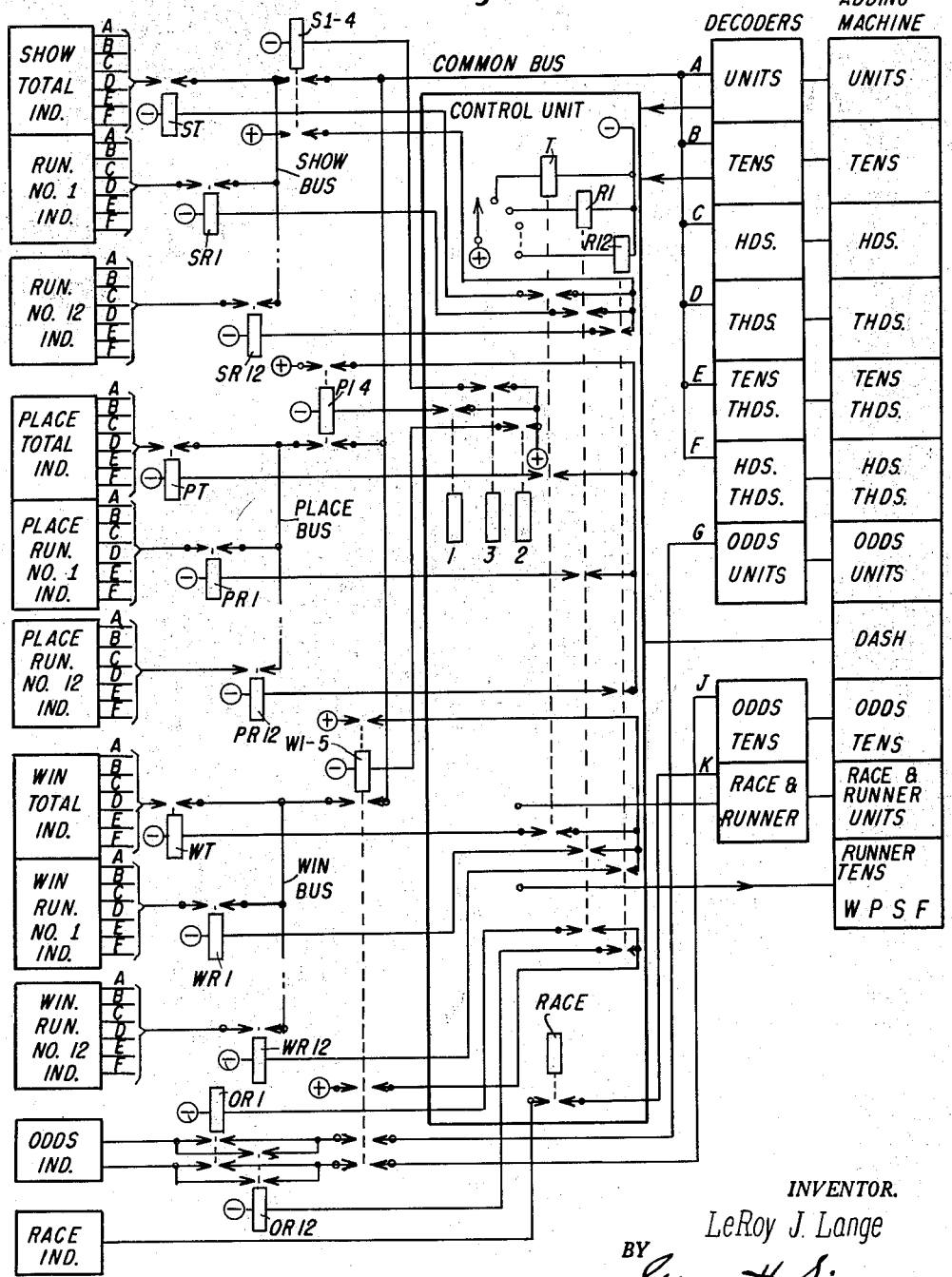

In the drawings, I have illustrated the invention by showing it applied to a totalisator system in which values are registered as total and individual runner values in each of three pools and in addition probable odds on runners in the win pool are computed and displayed.

At tracks where indication totalisators are used, values registered in the total adding machine in each of the three pools and in the individual runner adding machines in these pools are displayed on an infield board and elsewhere when more than one indicator board is used. The indicators in these display boards may be of the type shown in the Robinson Patent 2,121,164 issued June 21, 1938, and employ five relays per digit, two of which relays must be operated to form the digit on the indicator. At regular intervals, usually ninety (90) seconds, betting is momentarily stopped, the values then displayed on the various indicators are erased, and the values then registered in the various adding machines posted, after which betting is resumed.

Heretofore, at least some tracks have employed an observer, positioned so as to have a good view of the infield board. Each time a new indication cycle is completed, this observer has recorded the values on an adding machine thereby to check the accuracy of the registrations and indications and to accumulate data from which betting trends may be ascertained. These observers have usually entered the amount displayed as the pool total as a negative number, and the amounts displayed for the individual runners as positive numbers, with the result that in the event all indications are correct zero remains in the adding machine when a total is struck.

In instances when there are twelve runners entered in a race, the observer has to note and put in thirteen values for each pool, that is, a total value and twelve individual runner values, and it sometimes happens that the observer will not be able to check all three pools during each ninety second interval.

Many tracks also use an automatic odds computer of the type shown in Levy Patent 2,652,977, and at the end of each indication cycle this computer automatically computes and posts the probable odds on each runner in accordance with the values posted in the win pool.

The automatic observer of the present invention replaces the manual observer, and at the end of each indication cycle records on an adding machine tape the value posted for the total and each individual runner in each of the three pools, and in addition records the probable odds indicated for each runner in the win pool.

The indication code of the above Robinson patent employs five wires per digit, two of which contain positive potential when the indication is correct. Readily available solenoid operated adding machines, which may be of the type shown in the Boyden Patent 2,583,810, issued January 29, 1952, employ nine push buttons per decade and the control equipment includes decoder relays for each decade of the adding machine, to which decoder relays the indication busses are extended one at a time so that the value registered for each digit is decoded and the corresponding solenoid in the corresponding decade of the adding machine is operated to enter that digit in the adding machine.

To accomplish this function, a common indication bus leading to the decoder relays and consisting of five wires per digit is connected to pool indication busses, individual to each pool, one at a time in predetermined order, by pool access relays. The pool busses are connected to the total and individual runner indication conductors by relays that are operated one at a time in sequence. Through this arrangement the amounts indicated for the total and individual runners in the pools are registered and recorded in the adding machine in predetermined sequence.

In the device of the present invention, the pool access relay for the place pool is operated first, then the win pool access relay is operated, and finally the show pool access relay. This arrangement enables the automatic observer to be recording values registered in the place pool immediately after the end of the indication cycle and simultaneously with the operation of the automatic odds computer which is then connected to the win pool.

The control equipment includes a stepping switch which operates to extend a circuit to a total selecting relay, which total selecting relay operates to connect the total indication conductors in the selected pool to the common bus leading the digit decoders which operate to register the total amount in the adding machine which then prints the amount on the tape. The rotary switch then steps to its next contact, releasing the total relay and operating the relay for runner 1, thereby to connect the common bus to the indication bus of runner number 1 in the selected pool. This operation is repeated until all twelve runners have been connected to the decoding relays.

As each value is registered in the decoders and transferred thereby to the adding machine, the adding machine is operated to print the value so registered. Preferably the total value is registered as a negative number in a distinctive color such as red, together with a letter such as "P," indicating that this is the total in the place pool, and then the individual runner values are registered and printed as positive numbers together with a non-add number indicating the number of the runner. When all place pool values have thus been recorded, the control equipment operates the adding machine to strike a total. If all equipment is functioning properly, the value indicated as a total in the pool will be equal to the sum of the values indicated for the individual runners therein and when the total is struck there will be zero remaining in the adding machine. The recording of the place pool values thus being completed, the control equipment steps onto the win pool where corresponding registration and printing takes place. In addition, in the win pool, the probable odds on each runner posted by the automatic odds computer are also registered in the adding machine and printed upon the tape. The win pool registration and printing thus being completed, the control equipment steps to the show pool where the same operations are repeated.

At the beginning of each race, the track steward operates a steward's key which locks the ticket issuing machine to prevent the sale of further tickets on that race. The totalisator system then operates through a final cycle to register and post the final amounts in the various pools and on the various runners therein, together with the probable odds as computed by the odds computer.

During final cycle operation the automatic observer reverses the printing procedure used during betting, that is, total values are printed as positive numbers in black and the individual runner values are printed as negative numbers, that is, subtracted from the totals, the printing being in red. This reversal of the color scheme enables clear distinction between the various values registered upon the tape. In addition during the final cycle the adding machine prints the letter "F," indicating that that set of figures is a final cycle figure.

In order that the record printed upon the tape by the adding machine may be complete, the control equipment is arranged to cause the printing of the race number simultaneously with the printing of the pool legend, P for example, and the total sum then displayed in that pool.

Referring now to FIG. 1, it will be seen that I have shown a TOTAL INDICATOR for each pool and the RUNNER 1 and RUNNER 12 indicators in each pool as rectangles out of which five leads, A–F inclusive, are extended. These leads indicate that there are provisions for displaying six digits in each indicator. Since with the code used each digit requires five conductors, leads A–F each represent five conductors.

I have also shown six decoders which are connected to a COMMON BUS that contains thirty conductors that are multiplied into contacts on pool selecting relays S1–4, P1–4, and W1–5. Since the required thirty contact sets on each pool selecting relay are more than can be handled by one relay, each pool selecting relay indicated is actually several relays operated in parallel as one relay.

Each pool is equipped with a bus designated as the SHOW BUS, the PLACE BUS, and the WIN BUS. Operation of a pool selecting relay connects the COMMON BUS to the corresponding POOL BUS.

Associated with each indicator is a selecting relay which when operated connects that indicator to the POOL BUS. Thus, for example, relay ST connects the show total indicator to the SHOW BUS and the digits registered in code in the show total indicator are connected over the POOL and COMMON BUSSES to the decoders.

Operation of either the units decoder A or the tens decoder B transfers a pulse to the control unit which then operates to control the registration and printing of the decoded number by the adding machine printer.

The control unit of the observer contains relays designated as 1, 2, and 3, which are operated one at a time to close circuits to the pool selecting relays. As shown, operation of relay 1 selects relay P1–4, relay 2 selects relay W1–5, and relay 3 selects relay S1–4.

The control unit contains a stepping switch through a wiper of which relays T, R1 to R12 are selected one at a time in sequence. Thus with relay 1 operated, relay P1–4 will be operated and when relay T is operated a circuit will be extended to relay PT to connect the place total indicator to the decoders.

The solenoid operated adding machines used are provided with eleven decades of which six decades A–F control the adding portion of the machine and five decades, G, H, J, K and L, control the machine to print but not to add. Race numbers are displayed on indicator K and the control unit contains a RACE relay which is operated simultaneously with the relay T thereof. Thus the race number is decoded and printed simultaneously with the printing of the total of the selected pool. The control unit also extends a circuit to the eleventh decade of the adding machine to cause the machine to print a legend corresponding to the selected pool. Thus when the place total is being printed, the legend P and the race number will also be printed.

It will be noted that the probable odds are indicated on indicators G and J for each runner and that odds selecting relays OR1–OR12 are operated simultaneously with the runner selecting relays WR1–WR12, respectively. The odds indicated are thus connected to the G and J decoders which control the corresponding decades G and J of the adding machine to print the probable odds simultaneously with printing of the amount indicated on the runner. One of the digit controls of the odds indicators, preferably the G control, contains six instead of five wires, and when fractional odds such as 3–2, for example, are registered, a circuit is extended over the sixth wire to the H decade of the adding machine to set it to print the dash.

Figure 3:
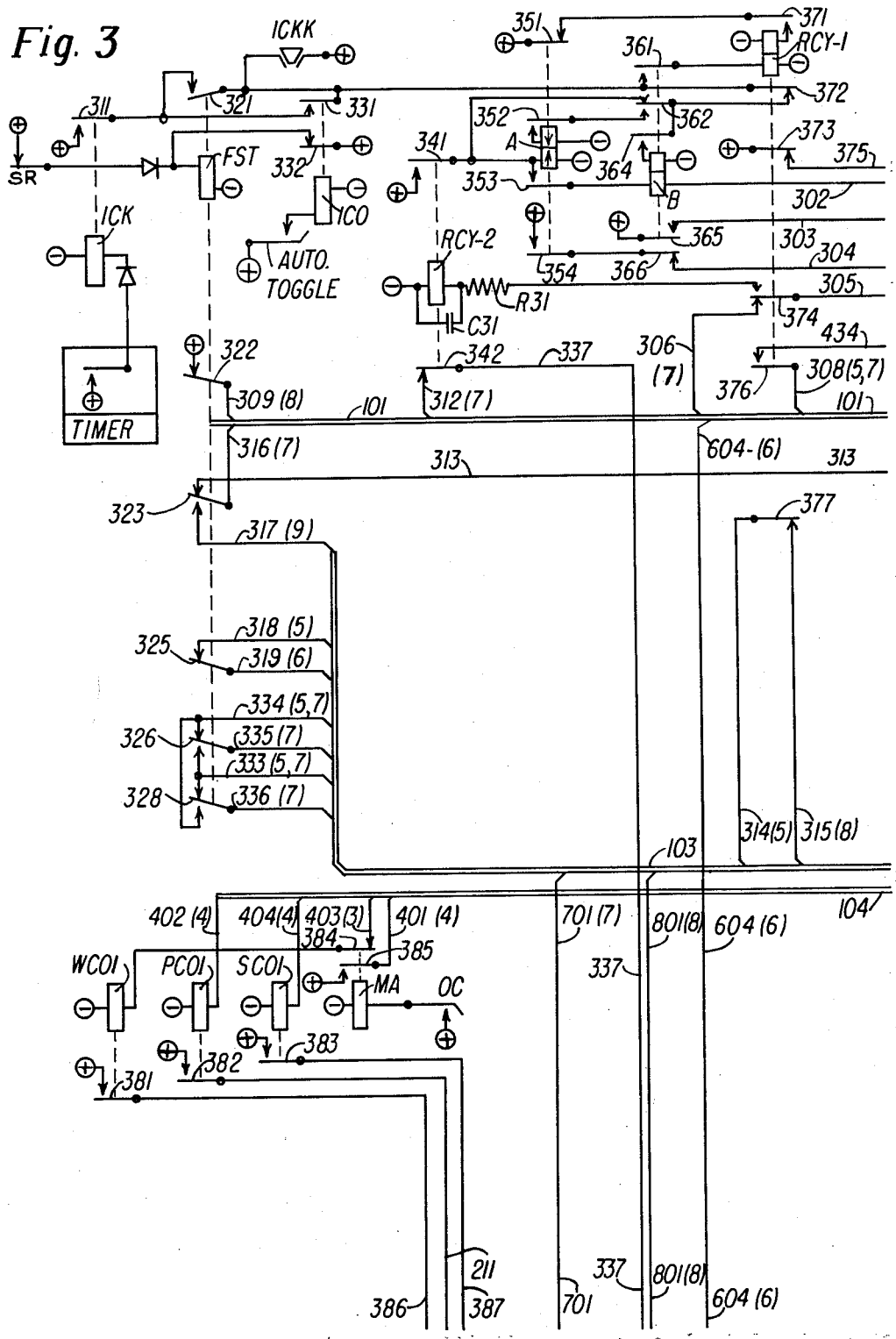
FIG. 3 is a schematic diagram of the relays by which operations of the observer are initiated.

Referring now to the drawings in more detail, I have shown in FIG. 3 a final start relay FST, which is maintained operated during betting over a circuit controlled by break contacts on the steward's relay SR of the totalisator. As is understood by those skilled in the art, the relay SR is operated by the steward at the start of a race to lock the totalisator so as to prevent further betting.

*Preparing the Observer for Operation*

Figure 5:
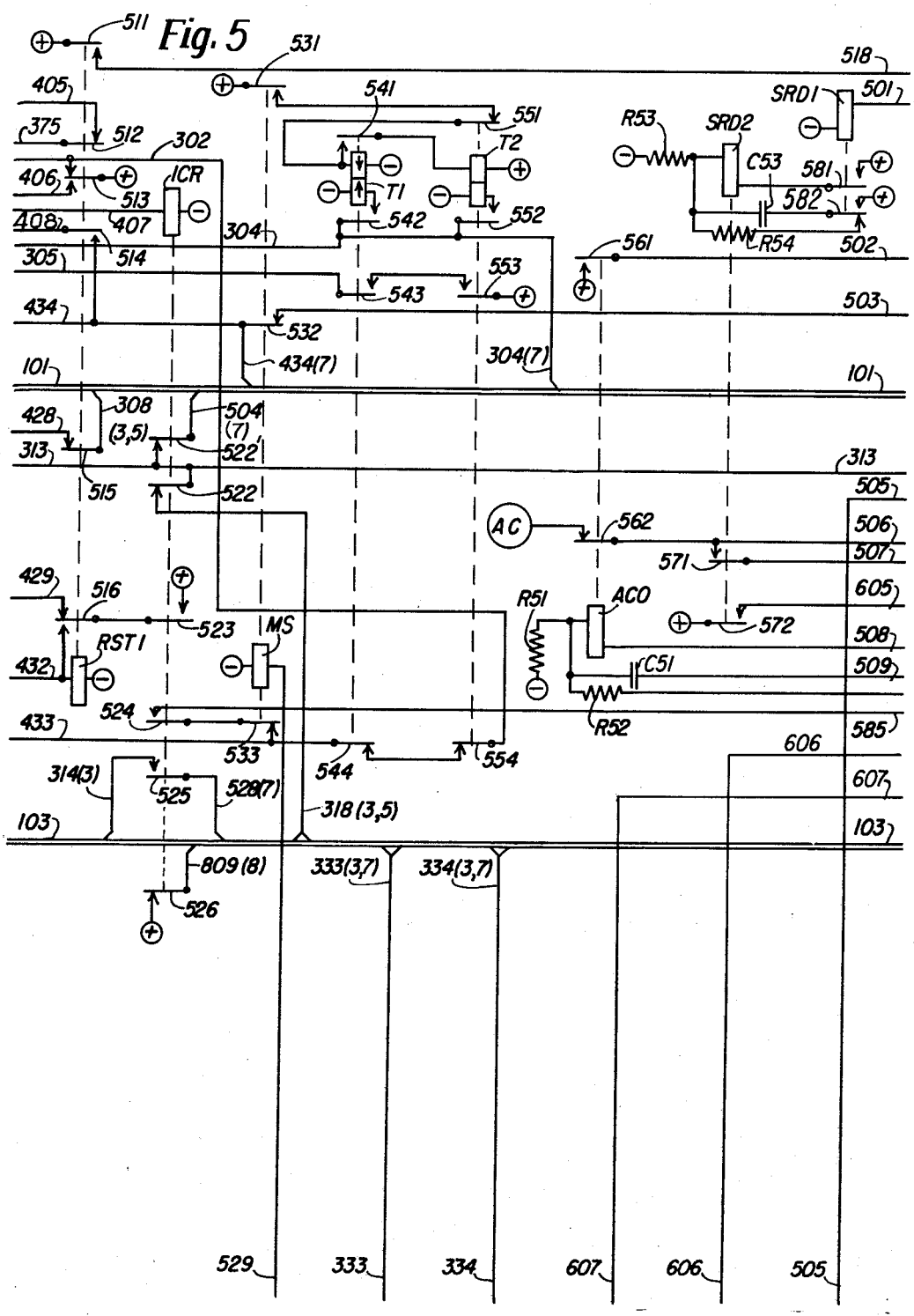
FIG. 5 is a schematic diagram of the stepping switch control, scratched runner relay control, and A.C. cut-off control.

The observer is prepared for operation by closing power key PK, FIG. 11, to operate the AC relay which supplies commercial A.C. to the A.C. common conductor, FIGS. 10 and 11, and to the A.C. terminals, FIGS. 11 and 5. The auto toggle switch, FIG. 3, is then closed to close the obvious circuit for the relay ICO, FIG. 3, which remains operated so long as the observer is in operation.

*Recording Place Pool Registrations*

When the TIMER of the totalisator system operates to transmit an indication pulse to the indication relays of the various pools of the system thereby to post on the indicators the amounts then registered, the relay ICK, FIG. 3, is operated over the obvious circuit.

A circuit may now be traced from positive through make contacts 311 and 331, through break contacts 372 and 362, through the lower winding of differential relay A to negative, operating that relay. When relay ICK restores at the end of the indication pulse, a circuit may be traced from positive at spring 513 and its break contact, conductor 302, through the lower winding of relay B, make contacts 353, through the lower winding of relay A to negative, relay A being maintained operated and relay B operating over this circuit. A circuit may now be traced from positive at make contacts 365, conductor 303, break contacts 431, conductor 407, through the indication control relay ICR, FIG. 5, to negative, operating that relay.

Figure 4:
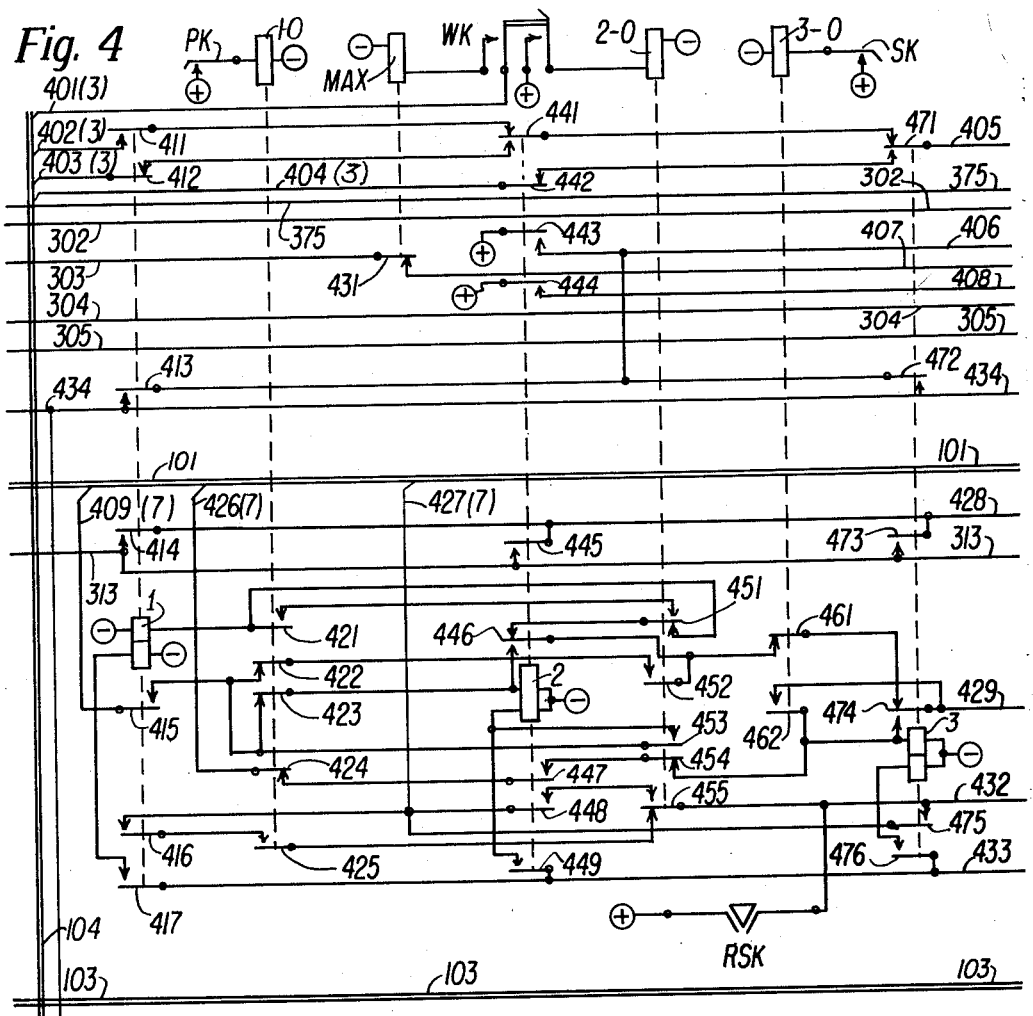
FIG. 4 is a schematic diagram of circuits over which the pools are selected one at a time in sequence.

Operation of relay ICR completes a circuit which may be traced from positive through make contacts 523, spring 516 and its break contact, conductor 429, spring 474 and its break contact, break contacts 461, spring 446 and its break contact, spring 451 and its break contact, through the upper winding of relay 1, FIG. 4, to negative, operating that relay.

Upon operating, relay 1 closes a holding circuit for itself which may be traced from positive on spring 513 and its break contact, conductor 302, break contacts 554 and 544, conductor 433, make contacts 417, through the lower winding of relay 1 to negative. At make contacts 411, relay 1 closes a circuit which may be traced from positive through break contacts 373, conductor 375, break contacts 512, conductor 405, spring 471 and its break contact, spring 441 and its break contact, make contacts 411, conductor 402 in cable 104, through the winding of PCO1 relay, FIG. 3, to negative. Relay PCO1 closes a circuit from positive through make contact 382, through conductor 211, through the winding of pool selecting relays P1–4, FIG. 2, which operate make contacts 200 to connect the PLACE BUS to the COMMON BUS of cable 106 leading to the decoders.

Figures 12, 13:
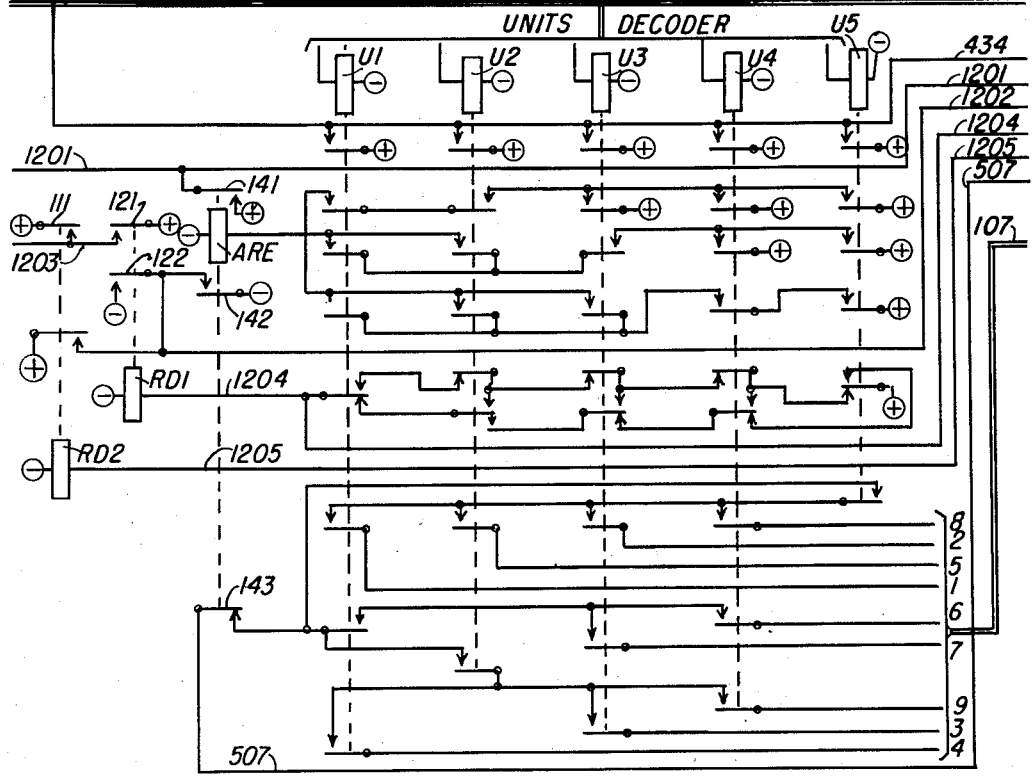
FIG. 12 is a schematic diagram of the units decoder associated with the first decade of the adding machine.
FIG. 13 is a table showing the code employed.

Operation of relay 1 closes a circuit which may be traced from positive on wiper A of the stepping switch, FIG. 13, now engaged with its twenty-sixth or home position contact, conductor 308 in cable 101, break contacts 515, conductor 428, make contacts 414, conductor 313, interrupter springs 711, through the winding of rotary magnet, FIG. 13, to negative, operating that magnet which opens the above circuit at springs 711, permitting the magnet to restore and advance the wipers of the stepping switch from their home position contacts to the first contacts in their respective banks.

A circuit may now be traced from positive previously traced over conductor 302 to break contacts 544, thence through break contact 533, make contacts 524, conductor 585, break contacts 642, conductor 601, the C wiper of the stepping switch and the first bank contact engaged thereby, conductor 316 in cable 101, spring 323 and its make contact, conductor 313, and thence over the previously traced circuit to the rotary magnet, operating that magnet which interrupts its own circuit at contacts 711 and restores to advance the wipers of the stepping switch out of engagement with the first and into engagement with the second contacts in their respective banks.

*Selecting Place Total*

The circuit previously traced to the C wiper of the stepping switch now extends over conductor 740, through the winding of the total selecting relay T, FIG. 9, to negative, operatin that relay. Operation of relay T closes the obvious circuit for the RACE relay, FIG. 9, which operates to connect the coded race number indication conductors to the race cable 108 leading to the decoder associated with the tenth decade of the adding machine to operate proper relays therein to prepare the circuit for the tenth decade solenoid corresponding to the race number then posted. A circuit may now be traced from positive through make contacts 212, conductor 213 in cable 105, through make contacts 965, conductor 214 in cable 105, through the winding of the place total relay PT, FIG. 2, to negative, operating that relay.

Operation of relay PT at make contacts 201 connects the leads A–F inclusive, of the place total indicator, to the PLACE BUS which is connected to the COMMON BUS of cable 106 by the operation of make contacts 200. Conductors A are thus connected to the units section of the decoder, FIG. 12, and conductors B–F are connected to the corresponding sections of the decoders shown in FIG. 11.

Positive placed on two of the five conductors represented by the lead A, in accordance with the code shown in FIG. 13, operate corresponding ones of the relays U1–U5, FIG. 12, thereby to decode that digit of the number registered in the PLACE TOTAL INDICATOR and to prepare a circuit over the appropriate one of the nine conductors in cable 107 thereby to prepare for operation of the solenoid required to enter that digit in the adding machine. The details of this decoding arrangement are fully explained in my co-pending application Serial No. 18,223, filed March 25, 1960, to which reference is here made. Simultaneously the other digits of the number registered in the PLACE TOTAL INDICATOR are decoded and circuits to the proper solenoids of the adding machne are prepared to enter the decoded number in the machine.

Since the adding machines used employ but nine keys per decade, cable 107 contains but nine conductors.

When a digit is zero, two decoder relays 3 and 4 will operate, but no circuit will be prepared thereby.

Figure 6:
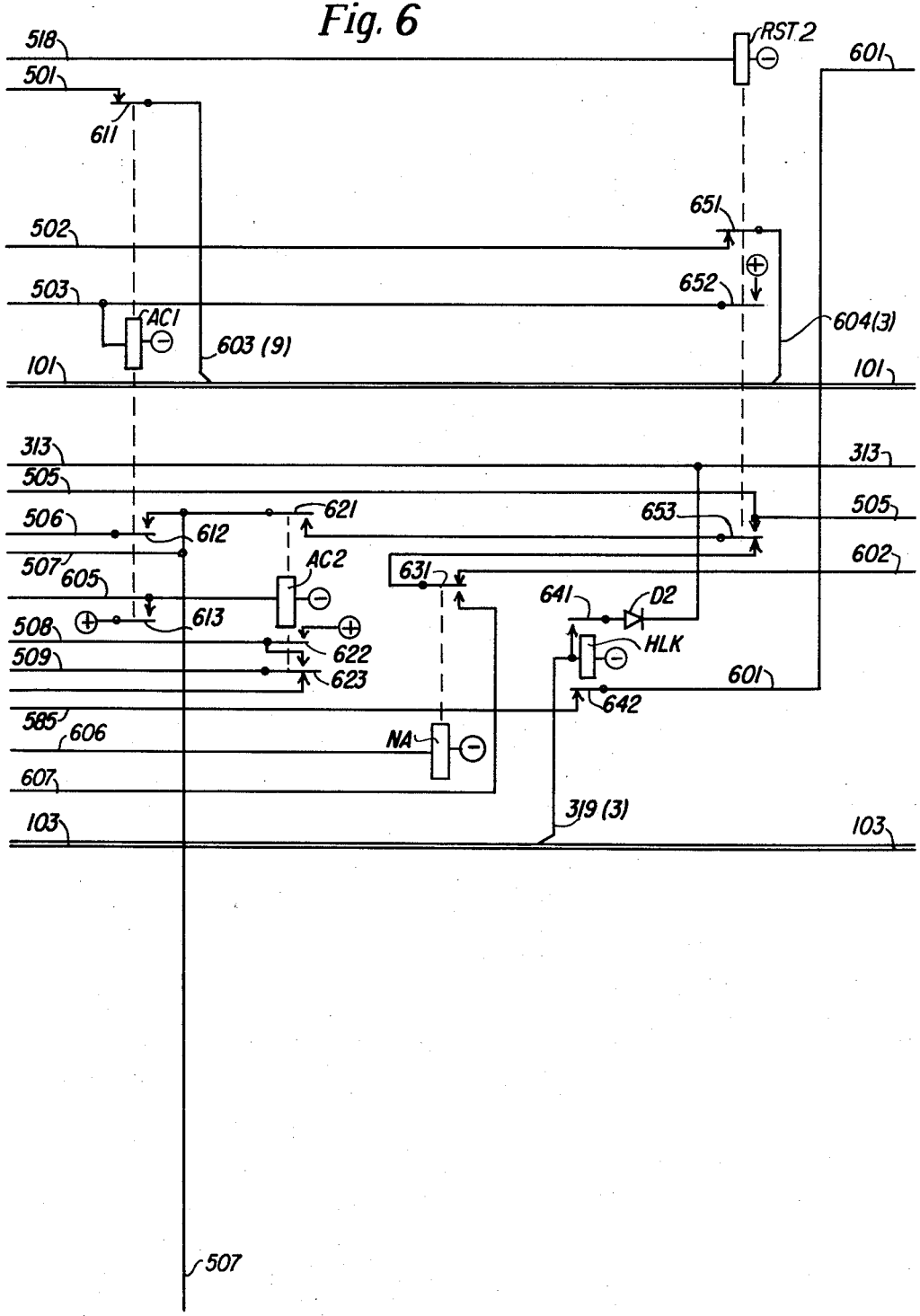
FIG. 6 is a schematic diagram of the alternating current application control and associated equipment.

As will be seen in FIG. 12, operation of any of the relays U1–U5 places positive upon conductor 434 thereby to extend a circuit through break contacts 532, conductor 503, through the winding of AC1 relay, FIG. 6, to negative, operating that relay.

Operation of relay AC1 connects the source of alternating current through break contatcs 562, conductor 506, make contacts 612, to conductor 507, thereby to extend the circuit through make contacts 962, conductor 216 in cable 105, make contacts 215, conductor 217 in cable 105, through the place solenoid P in the eleventh decade of the adding machine to the A.C. common conductor, operating that solenoid. A circuit is also extended from conductor 507, which circuit in the units decoder extends through break contacts 143, FIG. 12, and through operated contacts on the operated relays in this decoder, thence over the selected conductor in cable 107 corresponding to the units digit of the registered number, and through the solenoid in the first decade of the adding machine to the A.C. common conductor, to operate that solenoid. Similar circuits are extended from conductor 507 through the other decoders thereby to transfer the decoded number into the adding machine. Conductor 507 also extends to the decoder associated with the tenth decade of the adding machine to operate the solenoid therein corresponding to the posted race number.

Operation of relay AC1 also closes a circuit from positive through make contact 613 and conductor 605 through relay AC2 to negative, operating that relay. Relay AC2 closes make contact 621 to extend the circuit through conductor 507, through spring 653 and its break contact, spring 631 and its break contact, conductor 602, through the B wiper of the rotary switch now engaged with the second contact in its bank, conductor 335 in cable 103 connected thereto, spring 326 and its make contact, conductor 334 in cable 103, through the solenoid of the subtract button SUB, FIG. 11, of the adding machine to the A.C. common conductor. Solenoid SUB operates over this circuit to initiate a printing operation of the adding machine which under the conditions assumed will print the letter P designating the place pool record followed by digit 1, indicatnig the first race, followed by the number registered in the PLACE TOTAL INDICATOR, followed by a minus sign to indicate that this number has been entered in the adding machine as a negative number. Preferably this record is printed in red.

Since A.C. is supplied to the solenoids in the decades of the adding machine by operation of relay AC1, and since that relay also closes the circuit of relay AC2 which on operating extends A.C. from relay AC1 to the operate solenoid such as SUB, it is definitely assured that the digits to be printed will be entered in the adding machine before the printing operation thereof is initiated.

The adding machine contains off normal contacts ONC, FIG. 11, which are closed during the operation of the machine to extend a circuit from positive over conductor 529 through the MS relay, FIG. 5, to negative, to operate that relay.

At contacts 532, relay MS opens the circuit of relay AC1 which restores and at contacts 612 opens the circuit over which alternating current was supplied to conductor 507 and also to solenoid SUB, to restore these solenoids.

At contacts 533, relay MS opens the circuit previously traced to wiper C and relay T, to restore relay T which opens the circuit of relay PT which also restores and opens the circuits of the operated decoder relays which restore.

Operation of relay MS closes a circuit from positive through make contacts 531, break contacts 551, through the upper winding of differentially wound transfer relay T1 to negative, operating that relay. When relay MS restores, a circuit may be traced from positive through the upper winding of the T2 relay, make contacts 541, through the upper winding of T1 relay to negative, over which circuit relay T2 operates and relay T1 is maintained operated.

A circuit may now be traced from positive through make contacts 553 and 543, conductor 305, spring 374 and its break contact, conductor 306 in cable 101, through the winding of the rotary magnet, FIG. 7, to negative, operating that magnet. Operation of this magnet closes a circuit from positive through make contacts 712, conductor 304 in cable 101, through make contacts 552 and the lower winding of relay T2 to maintain that relay operated and through make contacts 542 and the lower winding of relay T1, causing relay T1 to restore.

Restoration of relay T1 opens the above circuit of the rotary magnet which restores to advance the wipers of the stepping switch out of engagement with the second contacts in their respective banks and into engagement with the third contacts therein.

*Selecting the Indication in Place Runner Number 1 Indicator*

The positive previously traced to the C wiper of the stepping switch is now extended over conductor 741, through the winding of the runner selecting relay R1, FIG. 9, to negative, operating that relay. Positive previously traced through conductor 213 of cable 105 is now extended through make contacts 955, conductor 218 of cable 105, through the winding of place runner selecting relay PR1, FIG. 2, to negative, operating that relay. Operation of relay PR1 at make contacts 202 connects the six sets of conductors A–F inclusive, of the place RUNNER NUMBER 1 INDICATOR to the PLACE BUS which is still connected to the cable 106 by the operation of make contacts 200, thereby to operate the decoders to prepare circuits for the solenoids of the adding machines to register therein the decoded number shown on the indicator. Operation of the decoder relays closes the circuit of the AC1 relay as before to apply alternating current to conductor 507 thereby to operate the selected solenoids in the various decades of the adding machine. A.C. on conductor 507 is extended through make contacts 952 to conductor 980 in cable 105, which conductor extends to the first solenoid in the tenth decade of the adding machine, operating that solenoid to prepare to print the digit 1 as the runner number.

Operation of relay AC1 closes the circuit of relay AC2 as before, and the alternating current circuit previously traced to the B wiper of the stepping switch is now in engagement with the third contact in its bank and is now extended over conductor 336 of cable 103 through make contacts 328, conductor 333 of cable 103, through the winding of the ADD solenoid of the adding machine to A.C. common, operating that solenoid to initiate an operation of the adding machine.

The number thus registered in the adding machine is added to the negative total and printed upon the tape as a positive number, the printing being in black.

The foregoing cycle of operation is repeated until each of the twelve indicators has been connected to the decoders and the number registered therein decoded and entered into the adding machine and printed upon the tape.

*Striking a Total*

The wipers of the stepping switch are in engagement with the fourteenth contacts in their respective banks during the recording of the number registered for runner number 12, and upon restoration of the relay MS, as previously explained, the motor magnet of the switch is operated to step the wipers into engagement with the fifteenth contacts in their respective banks.

The positive previously traced to the C wiper is then extended over conductor 434 in cable 101 through break contacts 532, conductor 503, through the winding of the AC1 relay to negative. Relays AC1 and AC2 operate as before and A.C. is extended by the operation of relay AC2 over the previously traced circuit to the B wiper of the switch and is extended by this wiper through conductor 505 leading to the TOTAL solenoid, FIG. 11, of the adding machine, operating that solenoid, thereby to operate the adding machine to strike a total.

Since the place pool total amount was entered in the adding machine as a negative number and the amounts on the various runners entered therein as positive numbers, if all registrations, decodings and printings have been correct, zero will remain in the adding machine and only the letter "T" will be printed.

Operation of the adding machine to strike this total reoperates the MS relay as before, and the motor magnet of the switch is operated to move the wipers out of engagement with their fifteenth and into engagement with the sixteenth contacts in their respective banks.

It will be noted that the sixteenth, seventeenth and eighteenth contacts engaged by the A wipers of the switch are multiplied together so that positive on this A wiper is extended through break contacts 721 to conductor 313 and thence over the previously traced circuit to interrupter contacts 711 and the rotary magnet to negative, to operate that magnet, which advances the wipers step by step into engagement with the nineteenth contacts in their respective banks. It will also be noted that contacts 19, 20, 21 and 22 are multiplied together and conductor 313 connected thereto so that the switch will be operated through four additional steps to bring its wipers into engagement with the twenty-third contacts in their respective banks.

The positive previously traced to the C wiper now extends over conductor 434 in cable 101, thence over the previously traced circuit to the relay AC1 which with relay AC2 operates as before to extend alternating current to the B wiper of the switch and thence to conductor 505 and through the TOTAL solenoid of the adding machine to operate that solenoid to again strike a total.

Operation of the adding machine operates relay MS as before and the switch is stepped out of engagement with the twenty-third contacts into engagement with the twenty-fourth contacts in its bank, where the foregoing circuits are again completed.

The total is again struck and the switch stepped into engagement with the twenty-fifth contacts in its bank and the total struck for a third time, as above. This multiple operation of the adding machine is in accordance with accepted practice to insure that the registers therein are restored to zero.

With the wipers of the switch engaging the twenty-fifth contacts in their respective banks, positive on wiper A is extended through conductor 409 of cable 101, through make contacts 415, break contacts 423, through the upper winding of relay 2 to negative, operating relay 2. Operation of relay 2 at spring 446 opens a point in the previously traced circuit through the upper winding of relay 1, and as a result when the circuit through the lower winding of relay 1 is opened by the operation of the MS relay and relays T1 and T2, as above explained, relay 1 restores. Operation of spring 446 out of engagement with its break and into engagement with its make contact extends the positive previously traced to said spring to the upper winding of relay 2 to maintain that winding energized independently of the circuit through wiper A over which the winding was energized. Restoration of relays T1 and T2 closes the holding circuit previously traced to conductor 433 which is now extended through make contacts 449 and the lower winding of relay 2 to negative to maintain that relay operated.

Operation of the adding machine as above, through the twenty-fifth contacts in the switch banks, and consequent operation of relay MS, reoperates the switch to step its wipers out of engagement with the twenty-fifth and into engagement with the twenty-sixth contacts in their respective banks.

The positive on wiper A is now extended over conductor 308 in cable 101, through break contacts 515, conductor 428, make contacts 445 on relay 2, conductor 313, and thence through the interrupter springs 711 and the rotary magnet to negative, operating that magnet to step the wipers out of engagement with the twenty-sixth and into engagement with the first contacts in their respective banks.

The circuit of the motor magnet previously traced through wiper C and its first bank contact is again closed and the switch operated to move its wipers into engagement with the second contacts in their respective banks.

*Selecting the Win Pool Bus*

During the interval in which the switch is moving into engagement with the second contact in its banks the circuit of relay PCO1, previously traced through make contacts 411, is opened by the operation of relay 2 and relay PCO1 restores, thereby opening the previously traced circuit over which relays P1–4 were operated to permit them to restore and disconnect the PLACE BUS from the COMMON BUS of cable 106.

The positive previously traced to spring 441 is now extended through that spring and its make contact, break contacts 412, conductor 403 in cable 104, break contacts 384, through the winding of the win cut-off relay WCO1 to negative, operating that relay which at make contacts 381 connects positive to conductor 386, thence through the winding of relay W1–5 to negative, operating that relay which at contacts 223 connects the WIN BUS to the COMMON BUS of cable 106. Operation of relay W1–5 also connects the leads extending out of the odds indicators to the odds portion of the COMMON BUS of cable 106 leading to the odds decoders shown in FIG. 10.

Thus when wiper C of the switch moves into engagement with the second contact in its bank, the positive previously traced to this wiper is extended over conductor 740 to the total relay T, FIG. 9, to operate that relay as before. Operation of relay W1–5 extends positive through make contact 220, conductor 221 in cable 105, through make contacts 966 on relay T, conductor 222 in cable 105, through the winding of the win total relay WT, FIG. 2, operating that relay. Operation of relay WT closes make contacts 224 thereby connecting the leads extended out of the WIN TOTAL INDICATOR to the WIN BUS, and since that bus is connected to the COMMON BUS the decoder relays are operated to decode the number registered in this indicator.

Operation of the decoder relays extends positive over conductor 434 to relay AC1 which operates as before to extend alternating current over conductor 507 and make contacts on the operated decoder relays to operate the solenoids of the adding machine and thereby register the decoded number in that machine. Alternating current placed on conductor 507 as above is extended through spring 962 on relay T to conductor 216 in cable 105 as before, and through make contacts 225 this current is extended over conductor 226 in cable 105 to the W solenoid in the eleventh decade of the adding machine, thereby to operate that solenoid to effect printing of the letter W. When relay AC2 operates and extends alternating current to the B wiper of the switch, the circuit is extended as before to the solenoid SUB of the adding machine to operate the machine to print.

Operation of relay T closes the circuit of the RACE RELAY, FIG. 9, as before, and as a result the adding machine prints W, the race number assumed to be 1, the amount registered in the WIN TOTAL INDICATOR as a negative number in the machine with the minus sign are printed to the right of the number, as before, and the legends so printed are preferably in red.

Operation of the adding machine during printing closes the off-normal contacts ONC and relay MS operates as before, and the stepping switch is stepped into engagement with the third contact in its bank, as before.

With the switch in this position, positive on the wiper C is extended over conductor 741 to again operate the relay R1. Relay WT having restored to disconnect the WIN TOTAL INDICATOR leads from the WIN BUS, the positive on conductor 221 of cable 105 is extended through make contacts 956 on relay R1 to conductor 227 in cable 105, which conductor leads to relay WR1, FIG. 2, operating that relay to connect the win runner number 1 indicator leads to the WIN BUS through contacts 228. The positive on conductor 221 in cable 105 also extends through make contacts 957, conductor 250 in cable 105, through odds relay OR1 to negative, operating that relay which at its make contacts 243, 244 and 245 connects the odds indicator leads to the odds portion of the COMMON BUS in cable 106. The numerical decoders and the odds decoders are operated and in the event that fractional odds are indicated on the indicators the circuit is extended through make contacts 244 on the OR1 relay, conductor 252 in cable 105, to the odds relay OD, FIG. 10, to negative, operating that relay.

Operation of the decoder relays places positive on conductor 434, and the previously traced circuits to the solenoids of the various decades of the adding machine are closed and the previously traced circuit to the ADD solenoid of that machine closed to operate the machine to print the number of the runner the odds has indicated on the odds indicator and the amount registered in the win runner number 1 indicator as a positive number.

The hereinbefore cycle of operation is repeated until the amounts and odds registered for each runner in the win pool is recorded upon the tape and a total is struck as before.

*Selecting the Show Pool Bus*

The switch moves off of its fourteenth contact and into engagement with its fifteenth contact as before and the hereinbefore operations are repeated until the A wiper moves into engagement with the twenty-fourth contact in its bank, at which time positive on this wiper is extended through this contact to conductor 426 in cable 101, thence through break contacts 424, spring 447 and its make contact on relay 2, break contacts 454, through the upper winding of relay 3 to negative, operating that relay. Operation of relay 3 moves spring 474 out of engagement with its break contact thereby opening the previously traced circuit over which the upper winding of relay 2 was maintained energized. Spring 474 moving into engagement with its make contact closes an auxiliary circuit for the upper winding of relay 3 over the previously traced circuit over which positive was placed on spring 474.

When the adding machine is again operated and relay MS operated as before, the holding circuit of relay 2 is opened at break contacts 553, 544, and 554, and that relay restores.

Operation of relay 3, in moving spring 471 out of engagement with its break contact, opens the previously traced circuit to relay WCO1 and when relay 2 restores, positive on spring 471 is extended through the make contact of that spring, break contacts 442, conductor 404 in cable 104, through the winding of relay SCO1, FIG. 3, to negative, operating that relay. Restoration of relay WCO1 opens the circuit over which relay W1–5 was operated, thereby permitting that relay to restore and disconnect the WIN BUS from the COMMON BUS. Operation of relay SCO1 closes make contacts 383 to extend positive over conductor 387 to relay S1–4 to negative to operate that relay, which at make contacts 230 connects the SHOW BUS to the COMMON BUS of cable 106.

The stepping switch moves into engagement with its twenty-fifth, twenty-sixth and first bank contacts as before, and then moves into engagement with the second bank contacts.

Operation of relays S1–4 closes make contacts 231 to extend positive over conductor 232 of cable 105 and when the previously traced circuit for relay T is closed this positive is extended through make contacts 964 to conductor 233 in cable 105, thence through the winding of the show total relay ST to negative, operating that relay. At make contacts 234, relay ST connects the SHOW TOTAL INDICATOR leads to the SHOW BUS and thence to the COMMON BUS leading to the decoders, operating the decoders as before.

Operation of the decoders places positive on conductor 434 and relay AC1 is operated as before to connect alternating current to conductor 507 and this current extended through make contacts 962 to conductor 216, as before. Operation of relay S1–4 closes make contacts 235 to extend this alternating current to conductor 236 of cable 105, which conductor is extended through the show solenoids of the eleventh decade of the adding machine to operate that solenoid.

When relay AC2 applies alternating current to the B wiper of the stepping switch, solenoid SUB is operated as before, to operate the adding machine to print the letter S, the race number, and the number registered in the SHOW TOTAL INDICATOR as a negative number, as indicated by a minus sign. Operation of the adding machine momentarily closes the circuit of relay MS as before, and the hereinbefore explained cycle of operations is repeated until the amounts registered on each of the show runner indicators have been recorded upon the tape.

In FIG. 14, I have shown a specimen tape upon which values have been recorded in accordance with the preceding description. On the top line of this tape, "P1 5280—" appears, this printing being preferably in red and the minus sign indicating that the number has been entered in the machine as a negative number. The next line, reading "1 486" indicates the amount recorded on runner number 1. The third line indicates "12 240," that being the amount assumed to be registered on runner number 12. The next four lines contain only the letter "T" at the right edge of the tape, indicating the striking of totals as above explained. The next line reads "W1 9546—," this recording being in red, indicating that the number has been entered in the machine as a negative number indicative of the amount of the total in the win pool at the moment, the first race being assumed. The next line reads "1:89 256." The ":89" indicates the probable odds on runner number 1 at the moment. The next line reads "12:3–2 980", indicating the amount registered and the probable odds on runner number 12 at the moment. The four "T's" indicate the striking of totals as before. The next line reads "S1 4370—", that being the amount assumed to be registered as a total in the show pool and the amounts registered on runners 1 and 12 are likewise shown together with the four T's, indicating the striking of the total.

The amounts shown in FIG. 14 are arbitrary amounts, as are the indicated probable odds in the win pool.

*Reset*

The C wiper of the stepping switch moves out of engagement with its fourteenth and into engagement with its fifteenth bank contact at the completion of the recording of the amount registered on runner number 12. As previously explained, the switch automatically steps from its sixteenth to its twenty-sixth bank contacts and when the A wiper engages the twenty-third contact in its bank, positive on this wiper is extended through that contact to conductor 427 in cable 101, thence through make contacts 475, conductor 432, through the winding of the reset relay RST1, FIG. 5, to negative, operating that relay.

At make contacts 511, relay RST1 extends positive over conductor 518 to the RST2 relay, FIG. 6, to negative to operate that relay. At spring 516 and its make contact, relay RST1 closes the obvious holding circuit for itself and at spring 513 and its break contact removes positive from conductor 302 thereby to open the circuit over which relays A and B are maintained operated, and also to open the holding circuit through the lower winding of relay 3. Relays A, B and 3 restore. Removal of positive from conductor 302 also removes positive from the previously traced circuit to wiper C of the switch.

Operation of relay RST1 at break contacts 512 also opens the previously traced circuit over which relay SCO1 was operated, permitting that relay to restore and open the circuit of relay S1–4 which also restores.

Restoration of relay B opens the previously traced circuit to relay ICR which restores. Restoration of relay ICR at break contacts 526 places positive on conductor 809 in cable 103, which conductor leads to the multipled together contacts 15 to 25 in the bank of the switch engaged by wiper D and this positive is extended through diode D1 and over conductor 318 in cable 103 through break contacts 522 on relay ICR to conductor 313 and thence over the previously traced circuit through interrupter contacts 711 and the rotary magnet to operate that magnet to move the switch into engagement with the twenty-sixth or home position contacts in its banks.

Operation of relay RST2 closes a circuit from positive through make contact 652 and relay AC1 to negative, operating that relay. Operation of relay AC1 closes the circuit of relay AC2 as before, and alternating current placed upon conductor 507 by the operation of relay AC1 is extended through make contact 621, through spring 653 and its make contact, conductor 505, through the winding of the TOTAL solenoid of the adding machine to operate that solenoid and thereby operate the adding machine to strike a total. This should clear the adding machine. Operation of the adding machine closes off-normal spring ONC to operate relay MS as before, without effect at the moment.

Restoration of relay ICR at make contacts 523 opens the holding circuit of relay RST1 which restores and at make contacts 511 opens the circuit of relay RST2 which restores and opens the circuit of relay AC1 which likewise restores. Under normal operating conditions the system is now restored to normal.

Normally the foregoing operations are completed during the ninety second interval between successive indication cycles and consequent successive operations of relay ICK. The foregoing operations are repeated after each indication cycle throughout betting.

*Non-Entered Runners Skipped*

Although the totalisator system and the observer of the present invention are both equipped to handle twelve runners in a race, it frequently happens that fewer than twelve runners will be entered in a particular race. The totalisator equipment includes a key for each runner number operated by the operator to open the bet circuit to the corresponding adding machine when there is no runner having that number entered in the race. Included in these keys are contacts shown in FIG. 8, which when the key is operated place positive on the corresponding contact in the bank of contacts engaged by the D wiper of the switch. Thus if there is no runner number 2 entered in a particular race, key HLK2 will be operated, thereby to apply positive to the fourth bank contact engaged by wiper D.

Each time the wiper D engages this fourth contact, this positive is extended through diode D1 over conductor 318 in cable 103, make contacts 325, conductor 319 in cable 103, through relay HLK, FIG. 6, to negative, to operate that relay which at make contacts 641 extends the circuit through diode D2, conductor 313, thence through the interrupter springs 711 and the rotary magnet, to negative, to operate that magnet which opens its own circuit and advances its wipers out of engagement with the fourth and into engagement with the fifth contacts in their respective banks. Thus it will be seen that the automatic observer automatically skips numbers having no runner entered in a particular race. Operation of relay HLK opens break contacts 642 to remove positive from wiper C, thereby to prevent operation of relay R2, FIG. 9, through the fourth contact engaged by this wiper.

*Final Cycle Operation*

As is understood by those skilled in the art, when the runners leave the post at the beginning of a race, the track steward operates a key which causes the totalisator system to be locked, after a predetermined interval, to prevent acceptance of further bets for that race. After the totalisator is locked, a final indication cycle is effected and the final amounts in the total and individual runner adding machines in each of the pools are posted on the infield board indicators. Final probable odds are likewise computed and posted.

During betting, relay FST, FIG. 3, is maintained operated through break contacts SR on a relay that is operated by the operation of the steward's key. Relay FST therefore restores at the beginning of a race and alters the circuits of the observer so as to print final cycle figures in a distinctive manner that enables them to be readily identified as final cycle figures.

Operation of relay ICK, while the final indication cycle pulse is on, initiates operation of the observer in the hereinbefore explained manner except that the circuit of relay A extends through break contacts 321 as well as make contacts 331, and relays 1, ICR and P1–4 are operated as before. The rotary switch is stepped to bring its wipers into engagement with the first contacts in their respective banks and positive placed on wiper C is extended through this contact and conductor 316 in cable 101 through break contacts 323, conductor 317 in cable 103, through the winding of the final cycle relay F, FIG. 9, to negative, operating that relay. Operation of relay F closes the obvious circuit for the RACE RELAY which operates to connect the race indicator to the race decoder. Operation of relay F closes a circuit which may be traced from positive through break contacts 713, conductor 702 in cable 101, make contacts 971, conductor 603 in cable 101, break contacts 611, conductor 501, through the winding of relay SRD1 to negative, operating that relay.

Operation of relay SRD1 closes obvious parallel circuits for relay SRD2, the first extending through make contacts 581, through the winding of the relay and resistance R53 to negative, and the second through spring 582 and its make contact, condenser C53, resistance R53, to negative. After a predetermined interval, relay SRD2 operates and extends positive through make contacts 572, conductor 605, through the winding of relay AC2 to negative, operating that relay. Alternating current is now extended from the source through make contacts 571 to conductor 507, thence through make contacts 972 to conductor 983 in cable 105, through the F solenoid of the adding machine to the A.C. common to operate that solenoid. Alternating current is also extended through make contacts 621, break contacts 653, break contacts 631, conductor 602, to the B wiper, thence through the first contact engaged thereby, conductor 336 in cable 103, spring 328 and its break contact, conductor 334 in cable 103, through the winding of subtract solenoid SUB to A.C. common to operate that solenoid and thereby initiate an operation of the adding machine which prints the letter F, the race number, assumed to be 1, and the negative sign, these legends being printed in red.

Operation of the adding machine momentarily operates relay MS as before, and the stepping switch is stepped out of engagement with the first contact in its bank and into engagement with the second contact therein.

Positive on the C wiper is extended to the T relay, FIG. 9, as before, and place total relay PT1 is operated to connect the PLACE TOTAL INDICATOR to the decoders as before. Operation of relay T also closes the circuit of the RACE relay which operates to connect the race number indicator to the race decoders. Operation of the units or tens decoder places positive on conductor 434 as before, to operate the AC1 relay, thereby to extend the previously traced circuit over conductor 507 to the solenoids of the adding machine selected by the decoders, thereby to register the place total in the adding machine. AC2 relay operates as before and extends A.C. over the previously traced circuit to the B wiper of the switch, the circuits extending over the conductor 335 in cable 103, through spring 326 and its break contact, conductor 333 in cable 103, through the winding of the ADD solenoid, FIG. 11, to A.C. common, operating that solenoid to print the place total. Operation of the adding machine momentarily operates relay MS as before and the switch is stepped into engagement with its next contact.

The hereinbefore explained cycle of operations is repeated until the total and individual runner indications in all three pools have been recorded upon the tape, the final probable odds being recorded when the win pool values are being recorded. The TOTAL solenoid is operated at the end of the recording of each pool as before, and upon the completion of the recording of the show pool values the observer is reset in the hereinbefore explained manner.

As hereinbefore explained, while betting is in progress, non-entered runners are skipped over circuits controlled by positive placed on corresponding contacts engaged by the D wiper of the switch, through the operation of keys HLK. On a final cycle, however, non-entered runners are not skipped. On all cycles during betting, positive picked up by wiper D, when in engagement with contacts corresponding to the numbers of non-entered runners, was extended over conductor 318 in cable 103 to make contacts 325 on relay FST and thence to relay HLK, as above explained. Restoration of relay FST opens make contacts 325, hence on a final cycle relay HLK is not operated.

Assume for the moment that there is no runner number 2; consequently when wipers of the switch engage the fourth contacts in their respective banks, positive on the C wiper will be extended to relay R2 to operate that relay. Operation of relay R2 at springs 941 extends the previously traced circuit to the relay SRD1, which operates. Circuits to the corresponding pool relays, such as for example PR2 not shown, are completed without effect since there are no registrations in the indicator corresponding thereto.

After an interval, relay SRD2 operates as before, closing the circuit to relay AC2 which applies alternating current to the B wiper which is now extended over conductor 336 in cable 103, thence through spring 328 and its break contact and conductor 334 to solenoid SUB, to operate that solenoid, thereby to operate the adding machine which prints the runner number 2 and a negative sign.

The foregoing process is repeated for each non-entered runner so that the record made on the final cycle includes the record of runner numbers which were not used in that race.

In FIG. 15, I have shown a final cycle tape made as above with no runner 2 entered in the race, assumed to be race 1. The first operation of the adding machine in connection with each pool, prints "F1 —," as explained above. This is followed by the printing of the pool total as a positive number, and then the printing of the runner values as negative numbers indicated by the "—" following the value. The runner numbers also appear. It will be noted the fourth line in each pool reads "2 —" indicating that no runner 2 was entered in the race and hence no values were registered for this runner. The probable odds are recorded in connection with the win pool and T's are recorded when a total is struck, as before. Since the pool total values are recorded in black as positive numbers and the individual runner values are recorded in red as negative numbers, the record is readily distinguishable from records made during betting.

*Late Scratch*

It sometimes happens that after betting on a particular race has been opened and some bets registered on a particular runner, that runner may be scratched. In such instances the money bet upon the scratched runner is refunded to the holders of tickets on that runner. Since the amount bet upon the late scratched runner is included in the amount registered in the total adding machines of the pools and posted on the corresponding indicators, and since there is no way of eliminating such amounts from these adding machines, it is necessary to subtract these amounts from the indicated totals to arrive at the net total available for distribution to the holders of winning tickets.

Under late scratch conditions the operation of the automatic observer makes such a substraction and records the net total on each cycle of operation.

In FIG. 8, I have shown late scratch keys LSK, of which there is one for each of the twelve runners, with only part of these keys shown in this figure.

Assume now that runner number 2 is scratched after betting has started and after some money has been registered on this runner. Key LSK2 is operated to its operated position. Positive placed on conductor 309 in cable 101, through the make contacts 322 on the FST relay, is extended through make contacts 821 to the fourth contact in the bank engaged by wiper D. If the runner lockout key HLK2 is also operated, as it should be, positive is also placed on this contact by this latter key. When wiper D engages the fourth contact, this positive is extended over the previously traced circuit to the relay HLK in FIG. 6 to operate that relay which upon operating extends the circuit to the motor magnet to step the switch off of contact 4 without initiating a printing operation. The late scratched runner is thus skipped during the betting period the same as non-entered runners.

Operation of key LSK2 also closes a circuit which may be traced from positive through make contacts 822, conductor 315 in cable 103, break contacts 377 on the relay RCY1, conductor 314 in cable 103, make contacts 525 on relay ICR, conductor 528 in cable 103, through the winding of the scratch control relay SC, FIG. 7, to negative, operating that relay. Relay SC upon operating opens break contacts 721 thereby to interrupt the circuit from the A wiper through contacts 16, 17 and 18 in its bank, over which circuit the switch was automatically stepped, as above explained.

The cycle of operation hereinbefore explained continues until amounts registered on all of the runners have been recorded and the switch moved into engagement with the fifteenth contacts in its banks and a total struck in the hereinbefore explained manner.

The total so struck will be out of balance by the amount registered on runner number 2 prior to the scratching of that runner, this amount being included in the total registered for the pool. When this amount is printed by the operations initiated through contact 15 and the B wiper, the adding machine clears out after printing and the switch is stepped to contact 16 as before.

With the wipers engaging the sixteenth contacts in their respective banks, positive previously traced to the C wiper is extended through this contact and the make contacts 724 on relay SC, conductor 740, to the T relay, FIG. 9, to operate that relay. Operation of the T relay operates the RACE relay as before, and extends the circuit to the total relay in the pool, assumed now to be the place pool, thereby to operate that relay and connect the PLACE TOTAL INDICATOR to the decoders to register the place total value in the adding machine. Operation of the decoders operates relays AC1 and AC2 as before, AC1 registering the place total value in the adding machine solenoid and AC2 extending the circuit previously traced to the B wiper of the switch through the sixteenth contact engaged thereby, conductor 333 in the cable 103 to the ADD solenoid, operating that solenoid to print the legend P, the race number assumed to be 1, and the total amount, as a positive number. Operation of the adding machine operates relays MS as before and the switch is stepped into engagement with the seventeenth contacts in its bank.

The positive previously traced through the C wiper is now extended through the seventeenth contact engaged thereby, make contacts 723 on relay SC, conductor 726, through the chain of break contacts 814, 815 and 816 on the keys LSK, make contacts 823 on key LSK2, conductor 824, through the winding of relay R2 to negative, operating that relay. Operation of relay R2 connects the place runner 2 indicator to the decoders, and also prepares the circuit for the tenth decade solenoid number 2, over conductor 981 as before. Relays AC1 and AC2 are operated as before and the alternating current on wiper B is extended through the seventeenth bank contact engaged thereby and conductor 334 in cable 103 to the subtract solenoid SUB of the adding machine, operating that solenoid to subtract the amount registered on runner number 2 prior to scratching, assumed to be 200, from the total registered in the place pool. Operation of the adding machine operates relay MS as before and the switch is stepped into engagement with the eighteenth contact in its bank.

Positive on the C wiper is extended through make contacts 722, and conductor 434, over the previously traced circuit to the relay AC1 to operate that relay which operates AC2 as before, and A.C. on the B wiper is extended through contact 18, conductor 505, to the TOTAL solenoid of the adding machine, to operate the adding machine which prints the difference remaining after the amount registered on runner number 2 has been subtracted from the total. The sum thus printed is the net total for the pool.

Operation of the adding machine operates relay MS as before and the switch is stepped from the eighteenth to its nineteenth bank contact and the previously traced circuit for automatic stepping of the switch is closed and the switch stepped from its nineteenth to its twenty-sixth bank contacts, with the circuit of the TOTAL solenoid of the adding machine closed to operate that adding machine to strike a total in the twenty-third, twenty-fourth and twenty-fifth positions of the stepping switch, as before.

The foregoing cycle of operation under late scratch conditions described in connection with the place pool is repeated in connection with the recording of the win and show pool amounts on each cycle of operation of the observer during the betting period. The details of this operation need not be repeated here.

On FIG. 16, I have shown a place pool record made during betting under late scratch conditions. The records "P1 5280—, 1 486, 3 540, 12 240" are made as above, as the switch moves from its second to its fourteenth contacts. When a total is struck in the fifteenth switch position, the 200 assumed to be registered on late scratch runner 2 remains in the adding machine and is recorded as "200 T." In the sixteenth switch position, the pool total is recorded as a positive number "P1 5280." In the seventeenth switch position, the amount registered on the late scratched runner is recorded as a negative number "2 200—." The total struck in the eighteenth switch position is the net total of the pool recorded as "5080T." Two more totals are struck as indicated.

The recording of the win and show pool amounts under late scratch conditions follow the same procedure and are not shown here.

On a final cycle as hereinbefore explained, non-entered runner numbers are not skipped but rather the runner numbers are printed on the tape to indicate that the runner is not entered. Under late scratch conditions the amount registered in the runner indicator of the late scratched runner prior to the scratching thereof, will be entered in the adding machine and printed on the tape the same as if the runner had not been scratched after betting started. As a result, when the switch moves into engagement with the fifteenth contacts in its banks and a total is struck, there will be zero remaining in the adding machine just as if there had been no late scratch. Notwithstanding this, the cycle of operations explained above and controlled through the sixteenth, seventeenth and eighteenth bank contacts is repeated to compute the net total by subtracting the amount registered on the late scratched runner from the indicated total in the pool. This operation is necessary since amounts bet on late scratched runners are refunded to the holders of tickets on that runner and computing the net total is necessary to determine the value of winning tickets.

In FIG. 17, I have shown a final cycle tape under late scratch conditions with runner 2 scratched after $200.00 had been registered on it. It will be noted that this tape differs from the final cycle tape shown in FIG. 16 in that "2 200—" replaces the "2 —" of that tape. The "P1 426660" is re-recorded as a positive number and "2 200—" then re-recorded and subtracted to determine "426460T" as the net total. In this figure only the place values are shown, but it will be understood that the net total is determined for each pool on the final cycle as well as on cycles made during betting.

*Re-Cycle*

Under normal operating conditions, the foregoing cycle of operation will be completed during the ninety second interval normally elapsing between successive indication cycles of the totalisator system. If for any reason a second indication pulse is received and relay ICK operated thereby, before the observer has completed the foregoing operations a re-cycle operation of the observer is initiated.

Under these conditions operation of relay ICK causes a circuit from positive through make contacts 311, make contacts 331, and thence over triplicate circuits. The first of these circuits extends through make contacts 361, through the lower winding of re-cycle relay RCY1, FIG. 3, to negative, operating that relay. The second circuit extends through break contacts 372, make contacts 362, make contacts 352, through the upper winding of the relay A to negative. Relay A being differentially wound and having both of its windings energized restores. The third parallel path extends through spring 372 and its break contact, make contacts 364, through the upper winding of relay B to hold that relay operated notwithstanding that the circuit through its lower winding is opened by the restoration of relay A.

Operation of relay RCY1 closes the obvious holding circuit through its upper winding and break contact 351 and make contact 371. At break contact 372, relay RCY1 opens the circuit of relay B which now restores and at make contacts 365 opens the previously traced circuit to relay ICR, restoring that relay.

At break contacts 373, relay RCY1 opens the circuit over which relays PCO1, WCO1 and SCO1 were operated, as previously explained. Whichever one of these relays happens to be operated at the moment the re-cycle operation was initiated, will be restored, thereby to disconnect the then connected POOL BUS from the COMMON BUS leading to the decoders.

Restoration of relay ICR at make contacts 523 opens the circuit over which relays 1, 2 and 3 were maintained operated, so that whichever one of these relays happens to be operated at the moment will be restored.

If at the moment the stepping switch wipers are in engagement with any one of the first fifteen contacts in their banks, positive on wiper A will be extended through the multipled together contacts in the bank engaged by this wiper, thence over conductor 504 in cable 101, through break contacts 521 on relay ICR to conductor 313, thence through interrupter springs 711 and the rotary magnet to negative, operating that magnet which interrupts its own circuit and advances the wipers to the fifteenth contacts in their respective banks.

Positive through break contacts 526 on relay ICR is extended over conductor 809 in cable 103 to multipled together contacts 15 to 25 in the bank engaged by wiper D, this positive being extended through diode D1 over conductor 318 in cable 103, thence through break contacts 522 on relay ICR to conductor 313 and automatic stepping of the switch is continued until the wipers thereof are in engagement with the twenty-sixth contacts, which is the home position of the switch. Restoration of relay ICR also opens make contacts 524 thereby opening the previously traced circuit over which positive was placed upon the C wiper of the switch so that no circuits are completed through this wiper as the switch buzzes to its home position.

With the switch in engagement with the twenty-sixth contacts in its banks, positive on wiper A is extended over conductor 308 in cable 101, through make contacts 376 on relay RCY1, conductor 434, through break contacts 532 on relay MS, conductor 503 and thence through the winding of relay AC1 to negative, operating AC1 which closes the circuit to relay AC2 as before. Alternating current is thus applied to the B wiper of the switch over the previously traced circuit and extended through the twenty-sixth contact engaged by this wiper and conductor 505 to the TOTAL solenoid of the adding machine, operating that machine to print as a total whatever amount happens to be registered therein at the moment. At the end of this printing, the adding machine clears itself and operates relay MS as before, which at break contacts 532 opens the circuit of AC1 permitting that relay to restore.

Relay MS, upon operating, closes circuits to relays T1 and T2 as before, and when these relays are both operated a circuit is extended from positive through make contacts 553, make contacts 543, conductor 305, spring 374 and its make contact, through resistance R31 and the winding of RCY2, FIG. 3, to negative, with a parallel path through condenser C31 which shunts this relay. Operation of relay RCY2 is momentarily delayed until condenser C31 receives its charging current and after a predetermined delay RCY2 operates.

Upon operating RCY2 closes make contacts 341, thereby closing the obvious circuit for relay A which operates and closes make contacts 354, thereby extending a circuit through break contacts 366, conductor 304, make contacts 542, through the lower winding of relay T1 energizing that winding. Relay T1 being differentially wound and having both of its windings now energized restores and opens the circuit of relay T2 which likewise restores. At break contacts 351, relay A opens the circuit over which relay RCY1 was maintained operated, and relay RCY1 restores, moving spring 374 out of engagement with its make contact and into engagement with its break contact, thereby opening the circuit of RCY2 which restores after a predetermined interval.

Restoration of relay RCY2 removes the short circuit from the lower winding of relay B and that relay is operated and relay A maintained operated in the hereinbefore explained manner. Operation of relay B at make contacts 365 extends positive over conductor 303 through break contacts 431 and conductor 407, through the winding of relay ICR to negative, to operate that relay. Re-operation of relay ICR at make contacts 523 closes the circuit of relay 1 which now operates as before, thereby to initiate the cycle of operation of the observer to record the values registered in the indicators in the hereinbefore explained manner.

Thus it will be seen that receipt of an indication cycle pulse while the observer is in operation cancels out the remainder of the cycle of operation of the observer, cancels the amount then registered in the adding machine, restores the observer and adding machine to normal, and initiates a new cycle of operation of the observer.

*Special Operations of the Observer*

It sometimes happens that it is advantageous to operate the observer to record only the amounts registered in one of the pools and in FIG. 4, I have shown keys PK, WK and SK. Operation of PK alters the circuits of the control equipment so as to cause it to record only place pool values, and operation of the WK alters the control equipment to record only win pool values, and operation of key SK arranges the control equipment to record only show pool values.

It sometimes happens that the number of runners entered in a particular race is small and that bets are accepted only to win or place. The circuits controlled by the keys WK and PK are arranged so that both of these keys may be operated simultaneously and as a result the observer will record only win and place amounts. The circuits are not arranged to permit recording only place and show amounts since this combination of bets is not encountered.

*Recording Place Pool Values Only*

Operation of relay PK closes the obvious circuit for relay 1–O and momentary operation of relay ICK results in the operations of relays A, B, 1, and ICR to control the operation of the recorder to record place pool values in the manner hereinbefore explained, until the stepping switch moves into engagement with the twenty-third contacts in its bank.

Positive on the A wiper is then extended through the twenty-third contact and conductor 427 in cable 101 connected thereto through make contacts 416 and 425, through spring 455 and its break contact, conductor 432, through the winding of relay RST1 to negative, operating that relay which upon moving spring 516 into engagement with its make contact closes a holding circuit for itself. Operation of relay RST1 at make contacts 511 closes the previously traced circuit for relay RST2 which operates and closes a circuit for relay AC1 as before. Relay AC1 again closes a circuit for relay AC2 which operates and alternating current is now extended from the source through make contacts 612 and 621, through spring 653 and its make contact, to conductor 505 and thence through the TOTAL solenoid of the adding machine, operating that solenoid to strike a total. Operation of relay RST1 also opens spring 513 from its break contact, thereby removing positive from conductor 302, causing relays A and B to restore as before. Restoration of relay B opens the circuit of relay ICR which likewise restores and break contacts 526 extend positive over conductor 809 in cable 103, thence through the multipled together contacts engaged by wiper D and thence over the previously traced circuit through diode D1, conductor 318 in cable 103, break contacts 522, conductor 313, interrupter springs 711 and the rotary magnet to negative, operating that magnet which interrupts its own circuit and buzzes the switch wipers into engagement with the twenty-sixth contacts in their respective banks.

Restoration of relay ICR at make contacts 523 opens the circuit over which relays RST1 and 1 were held operated, causing those relays to restore thereby to restore the equipment to normal. Upon receipt of the next indication pulse from the totalisator and consequent momentary operation of relay ICK, the foregoing cycle of operations is repeated.

*Recording Win Pool Values Only*

Operation of WK closes the obvious circuit for relay 2–O and also prepares a circuit for relay MAX. Momentary operation of relay ICK causes the operations of A and B as before; however, the circuit of relay ICR will not be closed immediately if an automatic odds computer is employed to compute probable odds based upon values registered in the win pool.

Operation of the odds computer closes springs OC, FIG. 3, thereby to close the obvious circuit for relay MA in the odd man's control cabinet, operating that relay. Operation of relay MA places positive on conductor 401 in cable 104 to extend a circuit through to make contacts of key WK and the winding of relay MAX to negative, operating that relay. Thus actual operation of the observer initiated by the operation of relay ICR is delayed so long as the odds computer remains in operation. When this computer has completed computing the odds, relays MA and MAX are restored and the circuit of relay ICR completed to initiate the operation of the observer.

Operation of relay ICR closes a circuit from positive through make contacts 523, break contacts 516, conductor 429, spring 474 and its break contact, break contacts 461, through make contacts 452, break contacts 422 and 423, through the upper winding of relay 2 to negative, with a parallel branch extending through make contacts 453 and the lower winding of relay 2 to negative. Relay 2 operates over this circuit and initiates operation of the computer to record values registered in the win pool, together with probable odds as before, the operation being the same until the switch moves into engagement with the twenty-third contact in its bank, at which time positive on wiper A is extended over conductor 427 in cable 101 as before, and thence through make contacts 448, spring 455 and its make contact, conductor 432, through the winding of relay RST1 to negative. Relay RST1 operates to start the hereinbefore described cycle of operation which is the same as in the case of recording of place pool amounts only, to complete the recording of the win pool amounts only and then restore the equipment to normal in readiness for receipt of the next indication cycle pulse from the totalisator.

*Recording Show Pool Values Only*

Operation of key SK closes the obvious circuit for relay 3–O and momentary operation of relay ICK and consequent operations of relays A, B, and ICR as before closes a circuit which may be traced from positive through make contacts 523, through spring 516 and its break contact, conductor 429, make contacts 462, through the upper winding of relay 3 to negative, operating that relay.

Operation of relay 3 initiates operations of the observer to record values registered in the show pool in the hereinbefore explained manner, the operation being the same until the switch wiper engages the twenty-third contacts in their respective banks, at which time positive on wiper A is extended over conductor 427 in cable 101, thence through make contacts 475 and conductor 432 to relay RST1, operating that relay which results in the adding machine striking a total and the restoration of the equipment to normal in the hereinbefore explained manner.

*Recording Win and Place Values Only*

When keys PK and WK are operating simultaneously, operation of relays A, B, and ICR as before, completes the circuit for relay 1 which is now traceable from positive through make contacts 523, spring 516 and its break contact, conductor 429, spring 474 and its break contact, break contacts 461, spring 446 and its break contact, spring 451 and its make contact, spring 421 and its make contact, through the upper winding of relay 1 to negative, operating that relay, and as a result place pool values are recorded in the hereinbefore explained manner, and when the switch engages the twenty-third contacts in its bank no circuit is extended over conductor 427; however, the TOTAL solenoid is operated and the switch stepped to its twenty-fourth contact in the hereinbefore explained manner.

The TOTAL solenoid is again operated and the switch stepped to its twenty-fifth contact, at which time positive on the A wiper is extended to conductor 409 in cable 101, through make contacts 415, make contacts 453, through the lower winding of relay 2 to negative, operating that relay which moves spring 446 into engagement with its make contact, thereby extending the positive previously traced to that spring, through the upper winding of the relay to hold the same operated. Simultaneously the TOTAL solenoid is again operated as before and the switch stepped into engagement with its twenty-sixth bank contact and thence into engagement with the first and second contacts in its banks, as before, and win pool values are recorded in the hereinbefore explained manner.

When the switch again reaches the twenty-third contact in its bank, positive on wiper A is extended over conductor 427 in cable 101, thence through make contacts 448, spring 455 and its make contact, conductor 432, through the winding of relay RST1 to negative, operating that relay thereby to initiate clearing out of the adding machine and restoration of the equipment to normal in the hereinbefore explained manner.

*Preventing Delay of Observer*

It will be noted in FIG. 9 that positive on conductor 702 is extended to conductor 603 whenever any one of the relays F, T, R1 to R12 is operated, with the result that relay SRD1 operates upon each operation of the observer. It will also be noted from FIGS. 11 and 12 that positive is placed on conductor 434 and extended to relay AC1 only by the units and tens decoders. As hereinbefore explained, positive is placed on a corresponding contact in the bank engaged by wiper D of the switch by the operation of the HLK key corresponding to a non-entered runner, thereby to cause the observer to skip that runner number.

Operation of relay SRD1 closes parallel circuits to relay SRD2 and the condenser C53 both of which extend through resistance R53. Relay SRD2 does not operate until condenser C53 is fully charged. In normal operation of the system, relay AC1 will be operated and the circuit of relay SD1 opened at break contacts 611 before relay SRD2 operates; however, if for any reason the switch fails to skip a non-entered runner, relay SRD2 will operate since no amount will be registered on the non-entered runner and therefore the circuit of relay AC1 will not be closed by the operation of the decoders.

Operation of relay SRD2 closes make contacts 571 thereby to extend A.C. to conductor 507, and also operates make contacts 572 to extend positive over conductor 605 to relay AC2, operating that relay. Through the operation of relays AC1 and AC2, the adding machine is operated to print, notwithstanding that no number was entered in it, and the stepping switch is operated to move its wiper into engagement with the next contacts in their respective banks. Through this arrangement failure of the D wiper of the switch to engage positive on the bank contact associated with a non-entered runner does not tie up the observer but rather results only in a momentary delay in its operation.

*Protecting the Adding Machine Solenoids*

Operation of relays AC1 and AC2, as hereinbefore explained, connect alternating current to the decade solenoids to register a number in the adding machine and then to the control solenoid such as ADD, to initiate an operation of the adding machine to record the number as entered in it. Relay AC2 at make contact 622 also extends a circuit over conductor 508, through the winding of relay ACO, FIG. 5, through resistance R51 to negative and through spring 623 and its make contact extends a parallel circuit over conductor 509, condenser C51 and resistance R51 to negative.

Operation of relay ACO is delayed during the interval required to charge condenser C51. In normal operation of the system, the adding machine will have operated and relay MS will have opened the circuit of relay AC1 before relay ACO operates; however, if operation of the adding machine is delayed for any reason for an interval sufficiently long to permit relay ACO to operate, operation of this relay opens break contacts 562, thereby to disconnect alternating current from the solenoids. Through this arrangement the solenoids are energized only for a predetermined interval and overheating thereof is prevented.

Figure 2:
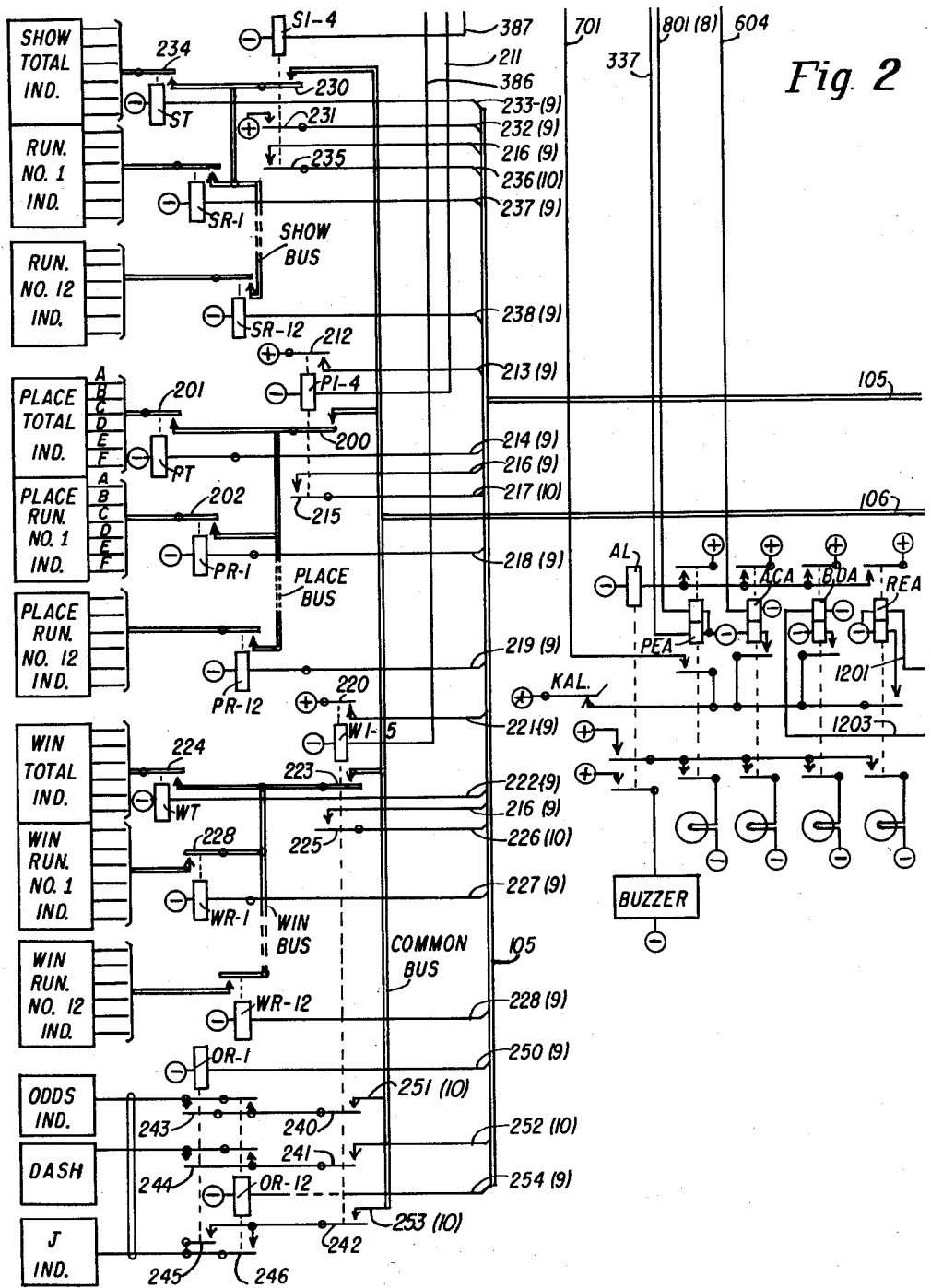
FIG. 2 is a schematic diagram showing the pool indicators, the pool busses, the common bus and connecting means associated therewith, together with alarm control relays.

Operation of relay ACO at make contacts 561 extends positive over conductor 502 through break contacts 651, conductor 604 in cable 101, through the winding of the alarm relay ACA, FIG. 2, to negative, operating that relay. Operation of relay ACA closes the obvious circuit for the alarm relay AL which operates to sound the buzzer calling attention to the alarm. Operation of relay ACA also closes a circuit for an alarm lamp to indicate to the operator the origin of the alarm. It will be noted that upon operating, relay ACA is held operated through its lower winding and key KAL which the operator must operate to erase the alarm.

Pool Error Alarm

As hereinbefore explained, when the total value in the pool is recorded as a number of one sign and the values on the runners in that pool recorded as values of the opposite sign, when the control switch moves into engagement with contacts 15 in its banks and a total is struck, there should be zero remaining in the adding machine. In case of any fault, either in the decoding or registration of the number or malfunction of the adding machine, an amount will remain in the adding machine when the total is struck.

In FIG. 8, I have shown pool error contacts PE which are closed when a total is struck with a value remaining in the adding machine. Positive through contacts PE is extended over conductor 802 and the E wiper of the switch in engagement therewith, to conductor 801 in cable 103, thence through the upper winding of the pool error alarm relay PEA to negative, to operate that relay which operates the relay AL and calls the operator's attention to the error and the location thereof.

It will be noted that positive placed on conductor 802 by the pool error switch is also extended to the twenty-sixth contact in the bank engaged by wiper E.

As hereinbefore explained, totals are struck when the wipers of the switch are in their twenty-third, twenty-fourth and twenty-fifth positions, and if this repeated striking of totals fails to return the register wheels of the adding machine to zero the above traced circuit to the pool error alarm relay will be closed when the switch is in its twenty-sixth position.

In the case of late scratch, the pool error alarm will be sounded when the switch is in position 15 since the amount registered on the late scratched runner prior to the scratching thereof still remains in the adding machine when the position 15 total is struck.

It will be noted that positive extended through the break contacts to key KAL and make contacts on relay PEA is extended over conductor 701 in cable 103 through break contacts 725 to conductor 312 in cable 101, thence through break contacts 342 to conductor 337 which leads through the lower winding of relay PEA to negative. Under late scratch conditions relay SC, FIG. 7, is operated as above and break contacts 725 opened thereby, and as a result relay PEA is not held in operated position and as a result the pool error alarm is sounded but momentarily.

It will also be noted that when a total is struck under re-cycling conditions as above explained, relay RCY2, FIG. 3, will be operated and the holding circuit for relay PEA will be opened at break contacts 342 so that the alarm will be sounded but momentarily under these conditions.

Decoder Alarms

As indicated in FIG. 12, each section of the decoder is equipped with a relay such as ARE. As explained in the above mentioned Robinson patent, the code used in this observer employs five relays per digit, two of which must be operated to register the digit. It will be noted that the circuit of relay ARE is extended through make contacts on the five relays in such manner that in the event more than two relays are operated due to any cause whatever, the circuit of relay ARE will be completed and that relay will operate.

Operation of relay ARE extends positive over conductor 1201 to the relay extra alarm relay REA, FIG. 2, to operate that relay and bring in an alarm.

Operation of relay ARE also extends positive through make contacts 142, conductor 1202, which it will be noted is multiplied into all of the decoders associated with the first ten decades of the adding machine, thence over conductor 606, through the winding of the non-add NA relay, FIG. 6, to negative, to operate that relay.

Operation of relay NA moves spring 631 out of engagement with its break and into engagement with its make contact, so that alternating current applied to this spring over previously traced circuit is extended over conductor 607, through the winding of the NON-ADD solenoid, FIG. 11, to operate that solenoid, thereby to operate the adding machine to print but not to add the amount registered in the machine even though digits of that amount be correctly registered in one or more of the decades therein.

In FIG. 12, I have also shown relay down relays RD1 and RD2, the circuits of which are extended through chain contacts on the five relays of the decoders in such manner that in the event but one of these relays is operated in any one of the decoders the circuit of relay RD1 will be completed and relay RD1 will operate to extend positive over conductor 1203 through the upper winding of relay down alarm relay RDA, FIG. 2, to operate that relay thereby to bring in an alarm.

Operation of relay RD1 also extends positive over conductor 1202 to the NON-ADD relay, thereby to complete the hereinbefore described operation of printing but not adding numbers registered in the adding machine.

It will be noted that the circuit of relay RD1 is extended over conductor 1204 to the decoders associated with the first six decades of the adding machine and that the circuit of RD2 is extended over conductor 1205 to the decoders associated with the seventh, ninth, and tenth decades.

Manual Controls

In FIG. 3, I have shown push button ICKK, operation of which initiates an indication cycle independently of the relay ICK, which is operated by the timer of the totalisator system. In FIG. 4, I have shown the reset button RSK which may be operated to manually initiate a reset operation of the equipment by energizing reset relay RST1.

Conclusion

From the foregoing, it will be apparent that the observer of the present invention, when used in connection with a totalisator system in which values are registered in three separate pools, upon the receipt of an indication cycle pulse, functions to decode and record the values registered on the total and individual runners in each pool one at a time in sequence, and that the accuracy of the registration, decoding and recording is automatically checked upon each operation of the observer. It will be further noted that on a final cycle of operation of the observer, the record is made in a distinctive manner so that it may be readily identified as a final cycle record.

The observer of the present invention also automatically computes and records net totals available for distribution under late scratch conditions by subtracting from the values registered as totals in each pool the amount registered in that pool on the late scratched runner prior to the late scratch.

The system of the present invention, while normally operating to record the various values in each of three pools, is equipped so that it may be operated to record only the values registered in a selected one of the pools or in two of the pools if desired. The observer of the present invention operates rapidly and under normal conditions completes its cycle of operation during the interval that elapsed between successive indication cycles of the totalisator system, the observer being also equipped to cancel out the remainder of its cycle and to initiate a new cycle in the event that a second indication pulse is received while the observer is in operation.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. The combination with a race track totalisator system in which are registered total values in each of three pools and individual runner values on each of a plurality of runners in each of said pools and in which the values so registered are transferred, at regular intervals during operation of the totalisator, in code to indicators that employ five relays and conductors per digit, two of which are energized to register the digit in the indicator, which values are also transferred to the indicators as final cycle values immediately after the totalisator is locked against further operation; of an automatic observer comprising: a solenoid operated adding machine having a larger number of decades than the number of digits in the values registered in the indicators; a plurality of decoders each arranged to register digits in a corresponding decade of said adding machine; a bus common to said decoders; a bus for each of said pools individual to that pool; a control unit; means in said control unit for connecting said common bus to said pool busses one at a time in predetermined order; means in said control unit for connecting the indicators in the pool associated with the connected pool bus, to said connected pool bus one at a time in sequence, thereby to transfer the digits in that indicator to the corresponding decoder to operate the same to decode the digit; means in the control unit for registering the decoded digits in said adding machine and for operating the adding machine to record the digits on the tape; and means in the control unit responsive to the recording operation of the adding machine for disconnecting the then connected indicator from the pool bus and for connecting the next indicator to that bus.

2. An automatic observer as specified in claim 1, in which the values registered in the total indicator in each pool are recorded by the adding machine as values of one sign and the values registered in the individual runner indicators in the pools are recorded by the adding machine as values of the opposite sign.

3. An automatic observer as specified in claim 2, in which the control unit contains means for operating the adding machine to strike a total after the last runner value in the pool has been recorded, which total is zero when the values have been correctly registered in the totalisator indicators and decoders, and have been correctly recorded by the adding machine.

4. An automatic observer as specified in claim 3, in which the control unit contains a relay that is maintained operated during operation of the totalisator and in which circuits controlled by said relay in operated position cause total values to be recorded as negative values and individual runner values to be recorded as positive values which are added to the negative total values to reduce the value in the machine to zero upon the recording of the last runner value in the pool.

5. An automatic observer as specified in claim 4, in which the normally operated control unit relay is restored by the locking of the totalisator and in which circuits controlled by the relay in restored position cause values registered in the total indicators after the locking of the totalisator to be recorded as positive values and the individual runner values to be recorded as negative values and subtracted from the positive total value to reduce the value in the machine to zero upon the recording of the last runner value in the pool.

6. An automatic observer as specified in claim 5, in which the adding machine contains contacts that are momentarily closed if there is a value remaining in the machine when the total is struck and in which the control unit contains an alarm relay and a circuit therefor closed by said contacts to operate the relay and thereby bring in an alarm which notifies the operator of the malfunction of the system.

7. An automatic observer as specified in claim 1, in which the control unit contains means operated, when the value registered on the last runner in the pool is recorded by the adding machine, to disconnect the then connected pool bus from the common bus and to connect the next pool bus thereto in accordance with said predetermined order.

8. An automatic observer as specified in claim 7, in which the adding machine contains a non-add decade arranged to print indicia identifying the pools and in which the means for connecting the pool busses to the common bus extends a circuit to that decade, over which circuit the decade is operated to print the corresponding pool indicia.

9. An automatic observer as specified in claim 8, in which restoration of a normally operated control unit relay prepares circuits over which said non-add decade is operated to print final cycle indicia to record the start of a final cycle operation of the observer.

10. An automatic observer as specified in claim 1, in which each decoder contains relay means operated when the number of operated relays in the decoder is different from two, and in which the control unit contains a non-add relay having a circuit closed by an operation of said relay means, which non-add relay upon operating causes said adding machine to print but not add digits registered in it.

11. An automatic observer as specified in claim 1, in which the observer receives a pulse from the totalisator each time values are transferred to the indicators, which pulse initiates a cycle of operation of the observer and in which the control unit includes a recycle relay means operated upon the receipt of a pulse during a cycle of operation of the observer, to terminate that cycle, to restore the observer and adding machine and to initiate a new cycle of operation of the observer.

12. An automatic observer as specified in claim 1, in which the control unit includes a late scratch key for each runner, which key is operable to scratch the runner after operation of the totalisator has begun and a value has been registered on that runner, and in which operation of a key controls circuits over which are controlled reprinting of the pool total value as a positive number, printing of the value registered on the runner prior to the operation of the key as a negative number, and striking a total to record the net total in the pool.

13. An automatic observer as specified in claim 12, in which operation of a late scratch key results in automatically skipping the late scratch runner on each cycle of operation of the observer during operation of the totalisator.

14. An automatic observer as specified in claim 13, in which restoration of a normally operated control unit relay at the start of a final cycle of the observer alters the control unit circuits to prevent skipping the late scratched number and to cause reoperation to compute the net total in the pool notwithstanding that the adding machine balances out when the total is struck after the recording of the value registered on the last runner entered in the pool.

15. An automatic observer as specified in claim 1, in which the control unit includes a key for each pool and a relay associated with each key, which relay is operated by an operation of the key to alter the cycle of operation of the observer so that only values registered in the indicators of the selected pool are recorded by the adding machine.

16. The combination with a totalisator system having a win pool indication board that contains indicators for displaying the total value registered in the pool, indicators for displaying the value registered on each runner in the pool, and indicators for displaying the probable odds on each of said runners, said system also including a race number indicator associated with said win pool indicators, each of which indicators employs five conductors and five relays per digit, two of which must be energized to effect a display; of an automatic observer comprising: a solenoid operated adding machine having a plurality of numerical decades and a plurality of non-add decades, one of which non-add decades is arranged to print pool identifying indicia; a plurality of decoders each associated with a corresponding decade in the adding machine; a control unit; means in said control unit for connecting said race number and total indicator conductors to corresponding ones of said decoders to operate those decoders; means in said control unit for registering the decoded numbers and the win pool indicia in the adding machine and for operating that machine to print the win pool indicia, the race number, and the total value registered in the total indicator; means in said control unit for releasing said connected indicators and then connecting the runner indicators and probable odds indicators to corresponding ones of said decoders in sequence to operate those decoders; said control unit means again operating to register the decoded value and probable odds and the runner number in the adding machine and to operate that machine to print the registered numbers; and means in said control unit operated after the decoding and printing of the registered values for the last runner for operating the adding machine to strike a total.

References Cited in the file of this patent
UNITED STATES PATENTS

| | | |
|---|---|---|
| 2,095,730 | Bellamy | Oct. 12, 1937 |
| 2,497,784 | Mehan et al. | Feb. 4, 1950 |
| 2,622,802 | Handley | Dec. 23, 1952 |
| 2,770,415 | Lindesmith | Nov. 13, 1956 |